US006282707B1

(12) United States Patent
Isozaki

(10) Patent No.: US 6,282,707 B1
(45) Date of Patent: Aug. 28, 2001

(54) PROGRAM TRANSFORMATION METHOD AND PROGRAM TRANSFORMATION SYSTEM

(75) Inventor: Hiroko Isozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/249,705

(22) Filed: Feb. 12, 1999

(30) Foreign Application Priority Data

Feb. 16, 1998 (JP) .................................................. 10-032852

(51) Int. Cl.[7] .......................................................... G06F 9/45
(52) U.S. Cl. .............................................................. 717/9
(58) Field of Search ................................... 717/4, 5, 6, 7, 717/8, 9, 10; 711/118, 129, 133, 158; 714/35, 38, 39

(56) References Cited

U.S. PATENT DOCUMENTS

| | | | |
|---|---|---|---|
| 5,452,457 | * 9/1995 | Alpert et al. ........................... | 395/709 |
| 5,530,964 | * 6/1996 | Alpert et al. ........................... | 395/709 |
| 5,535,329 | * 7/1996 | Hastings ................................. | 714/35 |
| 5,539,907 | * 7/1996 | Srivastava et al. ................... | 395/705 |
| 5,689,712 | * 11/1997 | Heisch ................................. | 395/704 |
| 5,724,586 | * 3/1998 | Edler et al. ........................... | 709/102 |
| 5,862,385 | * 1/1999 | Iitsuka ................................. | 395/709 |
| 5,963,972 | * 10/1999 | Calder et al. ........................ | 711/129 |

FOREIGN PATENT DOCUMENTS

| 1-118931 | 5/1989 | (JP) . |
|---|---|---|
| 9-34725 | 2/1997 | (JP) . |

OTHER PUBLICATIONS

Larus et al., "Rewriting executable files to measure program behavior", Univ. of Wisconsin Comp Science Tech Report, Mar. 1992, pp. 1–17.*

Sites et al., "Binary translation", Comm. of the ACM, Feb 1993, pp. 69–81.*

Wall, "Systems for late code modification", WRL Technical Note TN–19, Western Digital Laboratory, Jun. 1991, pp. 1–19.*

Stolberg et al., "Code positioning to reduce instruction cache misses in signal processing applications on multimedia RISC processors", IEEE, 1997, pp. 699–702.*

"Efficient Procedure Mapping Using Cache Line Coloring", by Amir H. Hashemi, et al., Dept. of Electrical and Computer Engineering Northeastern University, Boston, MA, pp. 171–183.

A. H. Hashemi, et al., "Efficient Procedure Mapping Using Cache Line Coloring", ACM SIGPLAN Notices, 1997, vol. 32, No. 5, pp. 171–182.

K. Pettis et al., "Profile Guided Code Positioning", ACM SIGPLAN Notices, 1990, vol. 25, No. 6, pp. 16–27.

W. C. Timothy, "Proliferating [sic] and Tracing Dynamic Library Usage Via Interposition", Proceedings of the Summer 1994 USENIX Conference, pp. 267–278.

* cited by examiner

*Primary Examiner*—Kakali Chaki
(74) *Attorney, Agent, or Firm*—Scully, Scott Murphy & Presser

(57) ABSTRACT

A program transformation method for transforming a source program described by a programming language into an object program described by a language executable by a data processing system, includes a process of transforming at least a part of procedure, function or sub-routine used in the source program into a form so that the object program can be stored in an arbitrary storage region of a primary storage device of the data processing system, a process of arranging procedure, function or sub-routine transformed or not transformed in the first process in the storage region corresponding to cache line of a cache memory among storage region of the primary storage device without causing cache conflict on the basis of information relating to the procedure, function or sub-routine obtained during a process of transformation of the source program into the object program, and a process of generating the object program, on the basis of the result of arrangement.

23 Claims, 16 Drawing Sheets

FIG. 2

```
extem int count = 0 ;
void func ()
{
    func1 ();
    func2 ();
    func1 ();
}
void func1 ()
{
    count += 1 ;
}
void func2 ()
{
    count += 2 ;
}
```

| PROCEDURE | CACHE LINE NUMBER |
|---|---|
| A | 1 |
| B | 1 |
| C | 2 |
| D | 2 |
| E | 2 |
| F | 1 |
| G | 2 |

FIG. 7

| ARRANGEMENT STEP | RED<br>r | GREEN<br>g | BLUE<br>b | YELLOW<br>y | NON-USEABLE GROUP<br>(COLOR CANNOT BE ARRANGED) |
|---|---|---|---|---|---|
| (1) E → C (100)<br>(2) A → B (90) | ⟵ E1 E2 C1 C2     A B ⟶<br>FOUR CACHE LINES | | | | E{b,y}, C{r,g},<br>A{y}, B{b} |
| (3) B → C (80) | E1 E2 C1 C2 B A | | | | A{r}, B{g,b,y} |
| (4) C → D (70) | D1 D2 space E1 E2 C1 C2 B A | | | | D{b,y} |
| (5) FILL LOW CALL FREQUENCY G IN VACANT SPACE | D1 D2 G1 G2 E1 E2 C1 C2 B A | | | | |
| (6) A → E (40) | D1 D2 G1 G2 E1 E2 C1 C2 B   A | | | | A{r,g}, B{b,y} |
| (7) FILL LOW CALL FREQUENCY F IN VACANT SPACE | D1 D2 G1 G2 E1 E2 C1 C2 B F A | | | | |

```
GROUP1 : !LOAD ?RX A0x1000 {

_D_LIB    = $ PROGBITS ?AX A0x20 _D_ test1 { D. o ( 1ibc. a ) } ;

_G_test2  = $ PROGBITS ?AX A0x20 _G_ test2 { test2. o } ;

_E_test2  = $ PROGBITS ?AX A0x20 _E_ test2 { test2. o } ;

_C_LIB    = $ PROGBITS ?AX A0x20 _C_ test1 { C. o ( 1ibc. a ) } ;

_B_test1  = $ PROGBITS ?AX A0x20 _B_ test1 { test1. o } ;

_F_test2  = $ PROGBITS ?AX A0x20 _F_ test2 { test2. o } ;

_A_test2  = $ PROGBITS ?AX A0x20 _A_ test1 { test1. o } ;
```

```
void func ( void )

{ func_A ( ) ;

func_B ( ) ;

func_A ( ) ;

}
```

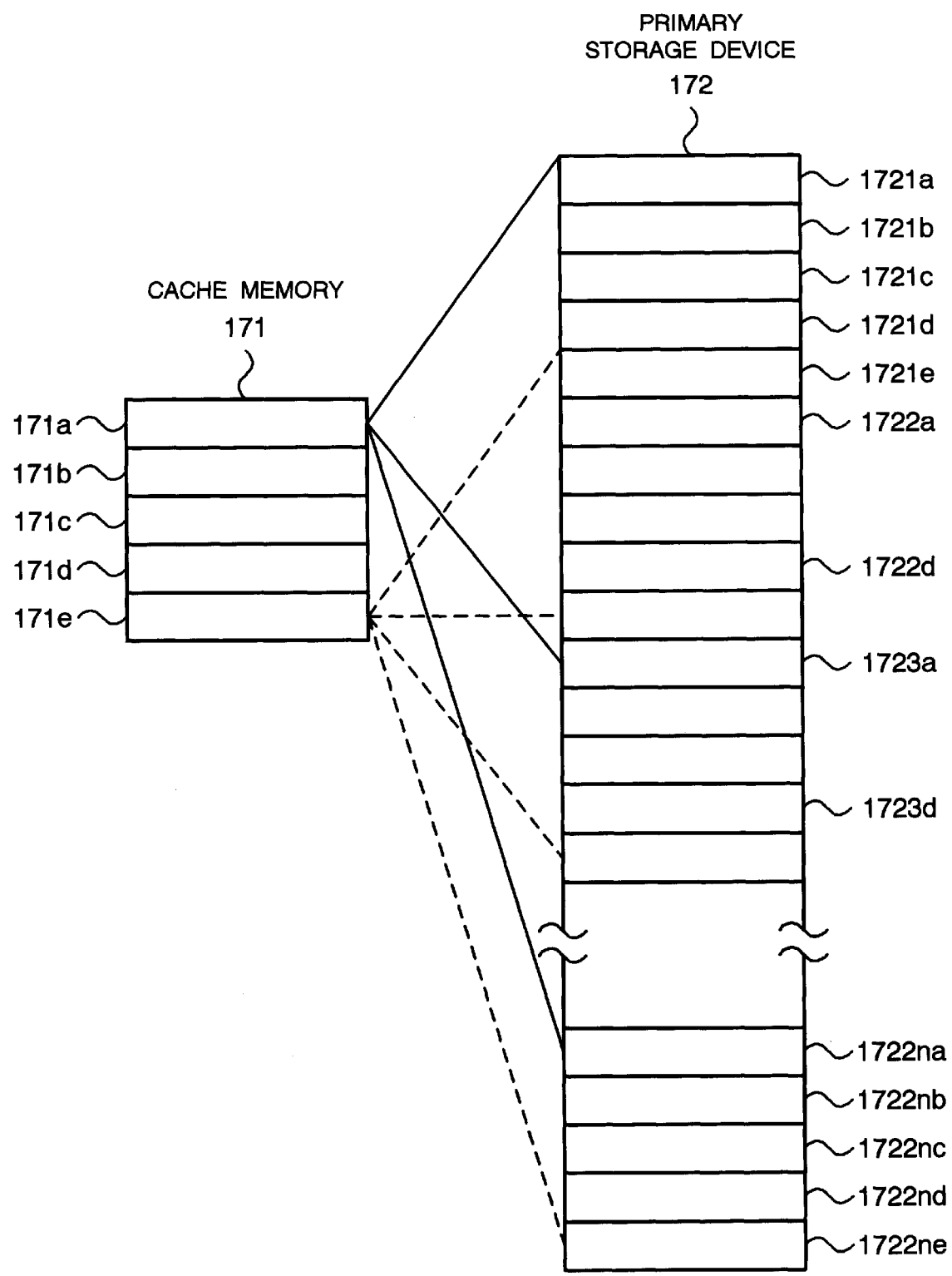

PROGRAM TRANSFORMATION METHOD AND PROGRAM TRANSFORMATION SYSTEM

BACKGROUND OF THE INVENTION

1. Field of the Invention

The present invention relates generally to a program transformation method, a program transformation system and a storage medium storing a program transformation program. More particularly, the invention relates to a program transformation method and a program transformation system for transforming (compiling) a source program described by a programming language into an object program described by a language (machine language, assembly language and so forth) executable by a computer, a central processing unit (CPU) and the like.

2. Description of the Related Art

FIG. 15 is a block diagram showing an example of a construction of the conventional program transformation system disclosed in Japanese Unexamined Patent Publication No. Heisei 1-118931.

The program transformation system illustrated in FIG. 15 is constructed with a first program storage portion 151, a compiler 152, a second program storage portion 153, a third program storage portion 154, an input data storage portion 155, a program executing portion 156, a fourth program storage portion 157 and a parsing result storage portion 158.

At first, the compiler 152 reads out a source program described by a programming language, such as C language and so forth from the first program storage portion 152, temporarily generates an object program described by a machine language, an assembly language and so forth, and stores the temporarily generated object program in the second program storage portion 153.

Here, the temporarily generated object program is the program generated by transforming the source program into codes of machine language, assembly language or so forth in a sequential order of description. While the temporarily generated object program is executable by the computer, the central processing unit (CPU) and so forth, since the source program is simply transformed into the codes in a sequential order of that in the source program, it inherently has redundant portions to make the size (code size) of the overall object program large as held in the temporarily generated form. Therefore, a large storage capacity is required in a primary storage device which is adapted to store the temporarily generated object program. Furthermore, an execution period of the object program becomes long to lower efficiency.

Therefore, it becomes necessary to generate an efficient and optimal object program. The object program simply transformed into the codes from the source program in a sequential order described in the source program in the process set forth above, will be hereinafter referred to as "temporary object program" distinguishing from an optimized final object program.

There are various method for optimizing the object program. Here, arrangement optimization of instruction codes in a procedure. The procedure means a group of processes, such as arithmetic operation, to be executed by the computer or CPU and is often called as function or sub-routine. Throughout the disclosure and claims, the group of processes will be generally referred to as "procedure".

In a program, it can become necessary to call other procedure (hereinafter referred to as "callee" side procedure) in execution of some procedure (hereinafter referred to as "caller" side procedure) at a certain portion of the program. Therefore, when the source program is transformed into the object program and the resultant object program is stored in the primary storage device, if an instruction code of the caller side procedure and an instruction code of the caller side procedure closely related to the former are physically arranged close with each other, a procedure call instruction can be changed from that for long jump to that for short jump.

By this, the code size of the overall object program can be reduced. In conjunction therewith, an execution speed upon executing the object program in the computer or the CPU can be higher. Arranging of the instruction codes having high possibility to be sequentially executed in time at physically close positions on the object program is called as arrangement optimization of the instruction codes of the procedures.

Next, the program executing portion 156 reads out a procedure call frequency parsing program from the fourth program storage portion 157 and executes the same. Namely, the program executing portion 156 reads out the temporary object program from the second program storage portion 153. In conjunction therewith, an input data stored in the input data storage portion 155 input by an operator is read out by the program executing portion 156. Then, the program executing portion 156 simulates execution of the temporary object program and, in conjunction therewith, integrates number of times of occurrence of call of other procedures in a certain procedure in the temporary object program. A result of integration is stored in the parsing result storage portion 158 as a procedure reference frequency parsing result.

By this, the compiler 152 reads out the procedure reference frequency parsing result from the parsing result storage portion 158 to calculates closeness of reference relationship between arbitrary two procedures. On the basis of a resultant closeness, arrangement optimization of the instruction code is performed to generate the final objective program to store in the third program storage portion 154.

On the other hand, FIG. 16 is a block diagram showing an example of a construction of the conventional program transformation system disclosed in Japanese Unexamined Patent Publication No. Heisei 9-34725.

The program transformation system illustrated in FIG. 16 is constructed with a source program storage portion 161, a compiler 162 and an object program storage portion 163, in general.

The compiler 162 is generally constructed with a parsing portion 164, a procedure call occurrence counting portion 165, a code generating portion 166, a procedure call count data storage portion 167, a special space arranged procedure determining portion 168, an object program outputting portion 169. Here, a special space means a special region of a finite code size set in a part of a program space.

The parsing portion 164 reads out the source program to be parsed from the source program storage portion 161 and parses a syntax forming the source program. The procedure call count portion 165 counts number of times of call of respective procedure per procedure recognized by the parsing portion 164 upon parsing the syntax.

The code generating portion 166 performs code generation twice. Namely, at first code generation, the code generating portion 166 generates a normal code if the syntax is not the procedure call instruction, and generates an instruction code using normal call instruction if the syntax is the procedure call instruction, on the basis of the result of parsing of the parsing portion 164. On the other hand, the code generating portion 166 scans the results of code generation in the first time from the leading end in the second code generation. Then, if the code is the procedure call instruction and, a result of inquiring to the special space arranged procedure determining portion 168 shows that the procedure is a special space arranged procedure determined to be arranged within the special space, a normal call instruction code having large byte count is replaced with a dedicated call instruction code having smaller byte count.

The procedure call count data storage portion 167 stores a call count counted by the procedure call occurrence counting portion 165 per procedure and a code size of the code generated in the first code generation. The special space arranged procedure determining portion 168 selects and determines a procedure to be arranged within the special space with providing preference for the procedure having greater call count so that a sum of the code sizes of the procedures to be arranged within the special space falls within a code size of the special space on the basis of call count and code side per procedure stored in the procedure call count data storage portion 167.

The object program output portion 169 outputs the code to a segment added an arrangement attribute to the special space when a result of inquiry to the special space arranged procedure determining portion 168 shows the code generated by the code generating portion 166 is the code of a definition portion of the special space arranged procedure, and when the code generated by the code generating portion 166 is not the code of the definition portion of the special space arranged procedure, a normal segment is output. Here, the segment means a group of codes as minimum unit of arrangement when the code is arranged within the program space.

As set forth above, the object program output portion 166 separates the special space arranged procedures and the normal procedures. Next, the object program output portion 169 outputs data of parameter region or so forth, outputs a code portion and a data portion in combination as object program, and stores in an object program storage portion 163.

With the construction set forth above, the code size of the generated object program can be reduced. Associating with this, the program space can be saved. Also, the execution speed upon execution of the object program by the computer or the CPU can be higher.

On the other hand, in the conventional program transformation system disclosed in Japanese Unexamined Patent Publication No. Heisei 1-118931, since an object to perform arrangement optimization of the instruction code of the procedure is only procedure which the user defines in the source program, improvement of efficiency of the object program is limited.

On the other hand, in the conventional program transformation system disclosed in Japanese Unexamined Patent Publication No. Heisei 9-34725, since the special space has a finite code size, the procedures to be arranged within the special space are limited. Therefore, improvement of efficiency of the object program is limited.

On the other hand, when the object program generated by the program transformation system is to be executed by a one-chip microcomputer consisted of CPU, decoder and so forth, the object program is stored in the external primary storage device so that each code of the object program is read out sequentially from the primary storage device. Then, after decoding by the decoder, the CPU parses the object program for execution. In this case, in order to speed-up the execution speed of the CPU, a cache memory for temporarily having small storage capacity and high access speed and storing the codes read out from the primary storage memory which normally has large storage capacity and low access speed, is provided in the one-chip microcomputer.

In the one-chip microcomputer provided with the cache memory, when the CPU executes the code, each code in the object program read out from the primary storage device cannot be decoded by the decoder and parsed and executed by the CPU until it is once stored in the cache memory. In the one-chip microcomputer of this kind, there are various method to store each code read out from the primary storage device in the cache memory. Amongst, a direct map method is one of the method for storing each code in the cache memory.

As shown in FIG. 17, in the direct map method, a cache memory 171 is divided into a plurality of storage regions (hereinafter referred to as cache lines). In conjunction therewith, each storage region of the primary storage device 172 is also divided. Each storage region of the primary storage device 172 is established correspondence to each cache line of the cache memory 171.

In FIG. 17, the cache memory 171 is consisted of five cache lines 171a to 171e. Corresponding to these, the primary storage device 172 is divided into storage regions each having the same storage capacity to that of each cache line. Each storage region is corresponded to respective five cache lines 171a to 171e with taking five as a unit. Namely, storage regions 172-1a to 172-first embodiment of the primary storage device 172 are corresponded to the cache lines 171a to 171e as a group. Similarly, the storage regions 172-2a to 172-second embodiment are corresponded to the cache lines 171a to 171e. Final storage regions 172-na to 172-ne (n is natural number) are also corresponded to the cache lines 171a to 171e.

When the object program to be executed by one-chip microcomputer employing the direct map method is to be generated using the program transformation system, the following drawbacks should be encountered.

For example, when the source program described by C language shown in FIG. 18 is transformed into the object program by the program transformation system, as shown in FIG. 19, respective instruction codes of procedure func_A and func_B are stored in the primary storage device 172.

In FIG. 19, the instruction code of the procedure func_A is stored in the storage regions 172-1a to 172-1c of the primary storage device 172. Also, the instruction code of the procedure func_B is stored in the storage regions 172-2a _to 172-2b of the primary storage device 172. Accordingly, the instruction code of the procedure func_A is corresponded to the cache memory line 171a to 171c of the cache memory 171. On the other hand, the instruction code of the procedure func_B is corresponded to the cache line 171a and 171b of the cache memory 171.

In such case, when the CPU executes the object program generated by transformation of the source program shown in FIG. 18, the instruction code of the procedure func_A is read out from the storage regions 172-1a to 172-1c of the primary storage device 172 and is once stored in the cache lines 171a to 171c in the cache memory 171, and thereafter decoded by the decoder and parsed and executed by the CPU.

Next, the instruction code of the procedure func_B is read out from the storage regions 172-2a to 172-2b of the primary storage device 172, and temporarily stored in the cache lines 171a to 171b of the cache memory 171. Here, while a part of the instruction codes of the procedure func_A has already stored in the cache lines 171a and 171b of the cache memory 171, the instruction code of the procedure func_B is stored there over (overwritten). Therefore, a part of the instruction code of the procedure func_A cannot be read subsequently. Thereafter, the instruction code of the procedure func_B stored in the cache lines 171a to 171b of the cache memory b171 are decoded by the decoder and parsed and executed by the CPU.

Next, by the source program shown in FIG. 18, the instruction code of the procedure func_A has to be executed again. However, since the instruction code of the procedure func_B is already stored in the cache lines 171a and 171b of the cache memory 171, a part of the instruction code of the procedure func_A cannot be read out. Therefore, the instruction code of the procedure func_A is again read out from the storage regions 172-1a to 172-1b of the primary storage device 172. Then, the instruction code of the procedure func_A is temporarily stored in the cache lines 171a to 171b of the cache memory 171, decoded by the decoder and parsed and executed by the CPU.

As set forth above, when the instruction codes of two procedures which have high possibility to be executed sequentially in time, are stored in the storage regions of the primary storage device 172 corresponding to the same cache lines of the cache memory (this will be referred to as being loaded on the same cache line), all or a part of the instruction codes stored in the cache memory 171 read our from the primary storage device preliminarily, is overwritten by the subsequently written instruction codes of the procedure read out from the primary storage device and written on the same cache line of the cache memory 171. Such condition is referred to as conflict (cache conflict). If such conflict is caused frequently, effect of the cache memory for speeding up execution speed of the CPU can be negated. More worsely, it is possible to cause slow down of the execution speed of the CPU.

As methods for storing the cache memory of each code read out from the primary storage device, there are a fully associative method which permits storing of data of the primary storage device to any of the cache line on the cache memory, a set associative method as an intermediate method of the direct map method and the fully associative method and a plurality of cache lines of the cache memory to be arranged the data of the primary storage device are present, and so forth may be used in addition to the direct map method. As set forth above, it is possible to cause conflict of procedures on the cache memory.

In the conventional program transformation systems disclosed in Japanese Unexamined Patent Publication No. Heisei 1-118931 and Japanese Unexamined Patent Publication No. Heisei 9-34725, no consideration has been given for conflict as set forth above. Therefore, as a result of arrangement optimization of the instruction code of the procedure or arrangement of the procedure in the special space, if the instruction codes of two procedures having high possibility to be executed sequentially in time are loaded on the same cache line of the cache memory 171, conflict is inherent. Accordingly, even if the code size of the overall object program can be deleted, execution speed of the CPU cannot be accelerated.

On the other hand, the procedure to be frequently used in execution of the object program cannot speed up the execution speed of the CPU by reading the instruction code from the primary storage device 172 and storing in the corresponding cache lines of the cache memory every time of use, since the instruction code is not stored in the cache memory 171, the instruction code cannot be read out for conflict (these are generally called as cache miss). Therefore, it becomes necessary to store the frequently used procedure in the cache memory 171 as long as possible without causing conflict.

However, in the conventional program transformation systems disclosed in Japanese Unexamined Patent Publication No. Heisei 1-118931 and Japanese Unexamined Patent Publication No. Heisei 9-34725, nothing is considered with respect to the cache miss in execution of the object. Accordingly, even in this point, execution speed of the CPU cannot be speed-up.

SUMMARY OF THE INVENTION

It is an object of the present invention to provide a program transformation method and a program transformation system which can successfully prevent conflict of variation procedures on the cache memory, can prevent cache miss of the frequently used procedure and whereby can speed up execution of an object program by a computer, a CPU or the like.

According to the first aspect of the invention, a program transformation method for transforming a source program described by a programming language into an object program described by a language executable by a data processing system, comprises first process of transforming at least a part of procedure, function or sub-routine used in the source program into a form so that the object program can be stored in an arbitrary storage region of a primary storage device of the data processing system, second process of arranging procedure, function or sub-routine transformed or not transformed in the first process in the storage region corresponding to cache line of a cache memory among storage region of the primary storage device without causing cache conflict on the basis of information relating to the procedure, function or sub-routine obtained during a process of transformation of the source program into the object program, and third process of generating the object program, on the basis of the result of arrangement.

In the preferred construction, the procedure, function or sub-routine is at least one of that defined by a user in the source program, that defined and inspected by the user, that preliminarily prepared in a processing system in the programming language and that preliminarily prepared in a form of instruction code.

In another preferred construction, the information is obtained by execution of a temporary object program transformed from the source program and is consisted of information indicative of number of times that the procedure, function or sub-routine is actually called and information indicative of call relationship between procedures, functions or sub-routines.

In another preferred construction, the information is obtained by execution of a temporary object program transformed from the source program and is consisted of information indicative of number of times that the procedure, function or sub-routine is actually called and information indicative of call relationship between procedures, functions or sub-routines, in the second process, the procedures, functions or sub-routines are divided into a plurality of groups on the basis of call frequency, and the procedures, functions or sub-routines are arranged in the storage region corresponding to cache lines of a cache memory among the storage region of the primary storage device.

According to the second aspect of the invention, a program transformation method for transforming a source program described by a programming language into an object program described by a language executable by a data processing system, comprises first process of transforming at least a part of procedure, function or sub-routine used in the source program into a form for storing in an arbitrary storage region of a primary storage device of the data processing system when the object program is used in the data processing system, second process of transforming the source program into the object program, and in conjunction therewith, and concerning the object program, transforming procedure, function or sub-routine defined by a user in the source program into a form storable in arbitrary region of the primary storage device, third process of linking the procedure, function or sub-routine transformed into the first process and the object program obtained in the second process, fourth process of collecting dynamic information consisted of information indicative of number of times that the procedure, function or sub-routine is actually called, and information indicative of call relationship between the procedure, function or sub-routine with executing the object program obtained through the third process, fifth process of arranging the procedure, function or sub-routine in the storage region corresponding to the cache line of the cache memory among the storage region of the primary storage device with avoiding cache conflict, on the basis of the dynamic information, and sixth process of generating a final object program by linking the procedure, function or sub-routine transformed in the first process and the object program obtained in the second process, on the basis of the arrangement information.

In the preferred construction, the procedure, function or sub-routine is at least one of that defined by a user in the source program, that defined and inspected by the user, that preliminarily prepared in a processing system in the programming language and that preliminarily prepared in a form of instruction code.

In another preferred construction, in the second process, the procedures, functions or sub-routines are divided into a plurality of groups on the basis of call frequency, and the procedures, functions or sub-routines are arranged in the storage region corresponding to cache lines of a cache memory among the storage region of the primary storage device.

According to the third aspect of the invention, a program transformation method for transforming a source program described by a programming language into an object program described by a language executable by a data processing system, comprises first process of transforming the source program into a temporary object program, and in conjunction therewith, upon executing the temporary object program, inserting a code for counting number of times that the procedure, function or sub-routine is actually called, second process of linking one of the procedure, function or sub-routine that defined by a user in the source program, that defined and inspected by the user, that preliminarily prepared in a processing system in the programming language and that preliminarily prepared in a form of instruction code, with the temporary object program obtained through the first process, third process of collecting dynamic information consisted of information indicative of number of times that the procedure, function or sub-routine is actually called, and information indicative of call relationship between the procedure, function or sub-routine with executing the object program obtained through the second process, fourth process of arranging the procedure, function or sub-routine in the storage region corresponding to the cache line of the cache memory among the storage region of the primary storage device with avoiding cache conflict, on the basis of the dynamic information, and fifth process of transforming at least part of one defined by a user in the source program, one defined and inspected by the user, one preliminarily prepared in a processing system in the programming language and one preliminarily prepared in a form of instruction code among the procedure, function or sub-routine to be used in the source program into a form storable in an arbitrary storage region of the primary storage region, in which the object program is stored as actually used in the data processing system, sixth process, after transforming the source program into the object program, concerning the object program, transforming procedure, function or sub-routine defined by a user in the source program into a form storable in arbitrary region of the primary storage device, seventh process of generating a final object program by linking the procedure, function or sub-routine transformed in the fifth process and the object program obtained in the sixth process, on the basis of the arrangement information.

In the preferred construction, in the fourth process, the procedures, functions or sub-routines are divided into a plurality of groups on the basis of call frequency, and the procedures, functions or sub-routines are arranged in the storage region corresponding to cache lines of a cache memory among the storage region of the primary storage device.

According to the fourth aspect of the invention, a program transformation system for transforming a source program described by a programming language into an object program described by a language executable by a data processing system, comprises procedure transforming means for transforming at least a part of procedure, function or sub-routine used in the source program into a form so that the object program can be stored in an arbitrary storage region of a primary storage device of the data processing system, optimizing means for arranging procedure, function or sub-routine transformed or not transformed in the procedure transforming means in the storage region corresponding to cache line of a cache memory among storage region of the primary storage device without causing cache conflict on the basis of information relating to the procedure, function or sub-routine obtained during a process of transformation of the source program into the object program, and generating means for generating the object program, on the basis of the result of arrangement.

In the preferred construction, the procedure, function or sub-routine is at least one of that defined by a user in the source program, that defined and inspected by the user, that preliminarily prepared on a processing system in the programming language and that preliminarily prepared in a form of instruction code.

In another preferred construction, the information is obtained by execution of a temporary object program transformed from the source program and is consisted of information indicative of number of times that the procedure, function or sub-routine is actually called and information indicative of call relationship between procedures, functions or sub-routines.

In another preferred construction, the information is obtained by execution of a temporary object program transformed from the source program and is consisted of information indicative of number of times that the procedure, function or sub-routine is actually called and information indicative of call relationship between procedures, functions or sub-routines, in the optimizing means, the procedures, functions or sub-routines are divided into a plurality of groups on the basis of call frequency, and the procedures, functions or sub-routines are arranged in the storage region corresponding to cache lines of a cache memory among the storage region of the primary storage device.

According to the fifth aspect of the invention, a program transformation system for transforming a source program described by a programming language into an object program described by a language executable by a data processing system, comprise procedure transforming means for transforming at least a part of procedure, function or sub-routine used in the source program into a form for storing in an arbitrary storage region of a primary storage device of the data processing system when the object program is used in the data processing system, program transforming means for transforming the source program into the object program, and in conjunction therewith, and concerning the object program, transforming procedure, function or sub-routine defined by a user in the source program into a form storable in arbitrary region of the primary storage device, linking means for linking the procedure, function or sub-routine transformed into the procedure transforming means and the object program obtained in the program transforming means, dynamic information collecting means for collecting dynamic information consisted of information indicative of number of times that the procedure, function or sub-routine is actually called, and information indicative of call relationship between the procedure, function or sub-routine with executing the object program obtained through the linking means, and optimizing means for arranging the procedure, function or sub-routine in the storage region corresponding to the cache line of the cache memory among the storage region of the primary storage device with avoiding cache conflict, on the basis of the dynamic information, the linking means generating a final object program by linking the procedure, function or sub-routine transformed in the procedure transforming means and the object program obtained in the program transforming means, on the basis of the arrangement information.

According to the sixth aspect of the invention, a program transformation system for transforming a source program described by a programming language into an object program described by a language executable by a data processing system, comprises program transforming means for transforming the source program into a temporary object program, and in conjunction therewith, upon executing the temporary object program, inserting a code for counting number of times that the procedure, function or sub-routine is actually called, linking means for linking one of the procedure, function or sub-routine that defined by a user in the source program, that defined and inspected by the user, that preliminarily prepared in a processing system in the programming language and that preliminarily prepared in a form of instruction code, with the temporary object program obtained through the program transforming means, dynamic information collecting means for collecting dynamic information consisted of information indicative of number of times that the procedure, function or sub-routine is actually called, and information indicative of call relationship between the procedure, function or sub-routine with executing the object program obtained through the linking means, optimizing means for arranging the procedure, function or sub-routine in the storage region corresponding to the cache line of the cache memory among the storage region of the primary storage device with avoiding cache conflict, on the basis of the dynamic information, and procedure transforming means for transforming at least part of one defined by a user in the source program, one defined and inspected by the user, one preliminarily prepared in a processing system in the programming language and one preliminarily prepared in a form of instruction code among the procedure, function or sub-routine to be used in the source program into a form storable in an arbitrary storage region of the primary storage region, in which the object program is stored as actually used in the data processing system, the program transforming means transforming the source program into the object program, concerning the object program, transforming procedure, function or sub-routine defined by a user in the source program into a form storable in arbitrary region of the primary storage device, and the linking means generating a final object program by linking the procedure, function or sub-routine transformed in the procedure transforming means and the object program obtained in the program transforming means, on the basis of the arrangement information.

According to another aspect of the invention, a computer readable memory storing a language processing program for transforming a source program described by a programming language into an object program described by a language executable by a data processing system, the language processing program comprises first process of transforming at least a part of procedure, function or sub-routine used in the source program into a form so that the object program can be stored in an arbitrary storage region of a primary storage device of the data processing system, second process of arranging procedure, function or sub-routine transformed or not transformed in the first process in the storage region corresponding to cache line of a cache memory among storage region of the primary storage device without causing cache conflict on the basis of information relating to the procedure, function or sub-routine obtained during a process of transformation of the source program into the object program, and third process of generating the object program, on the basis of the result of arrangement.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 2 is an illustration showing one example of a source program to be used in the first embodiment of the program transformation system of FIG. 1;

FIG. 7 is an explanatory illustration for explaining the arrangement optimization process of the procedures in the optimizing portion in the first embodiment of the program transformation system shown in FIG. 1;

FIG. 17 is an illustration for explaining a relationship between a cache memory and a primary storage device in a direct map method;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

(First Embodiment)

Figure 1:
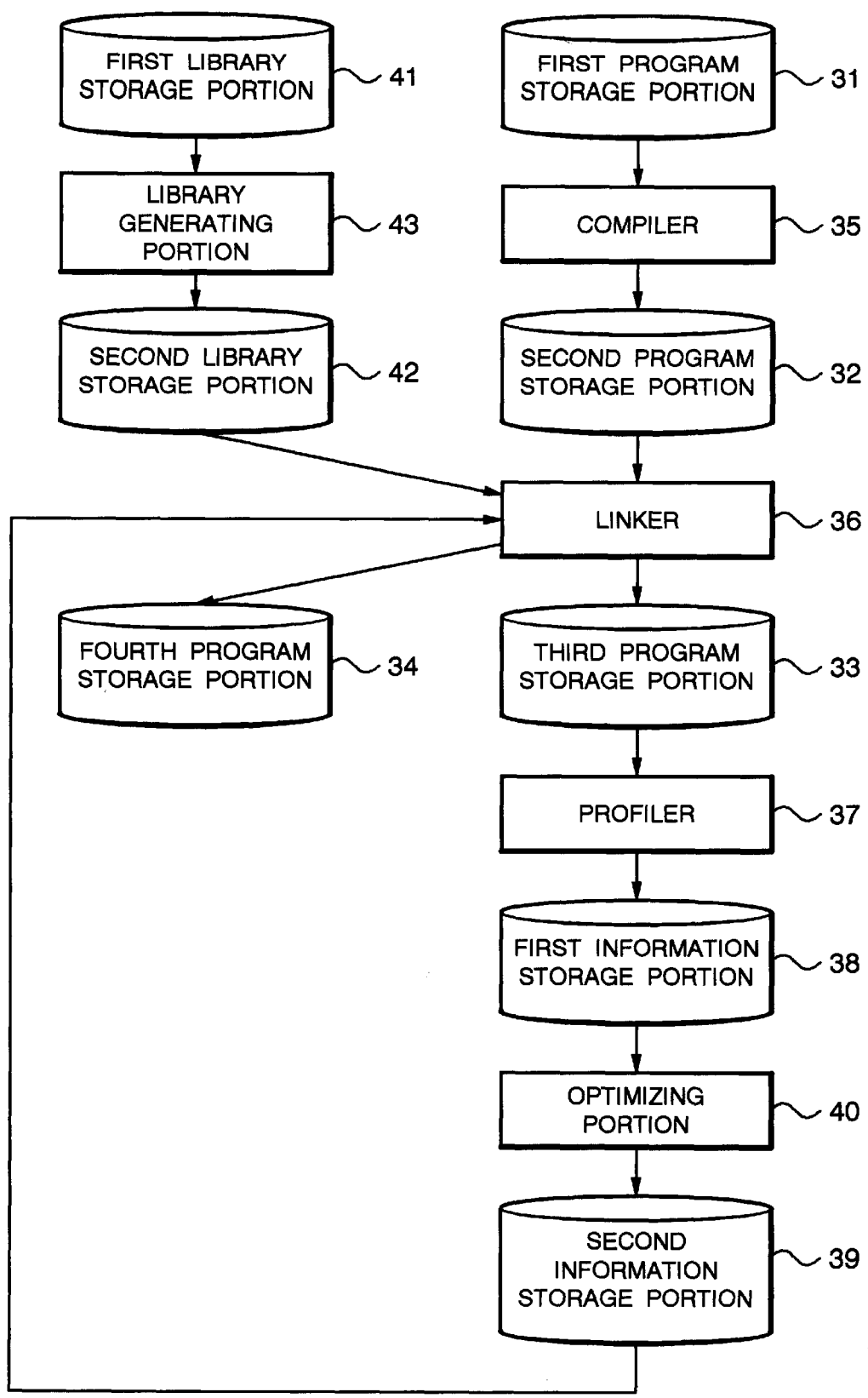
FIG. 1 is a block diagram showing a construction of the first embodiment of a program transformation system according to the present invention.

FIG. 1 is a block diagram showing a construction of the first embodiment of a program transformation system according to the present invention.

The shown embodiment of a program transformation system is generally constructed with first to fourth program storage portions 31 to 34, a compiler 35, a linker 36, a profiler 37, first and second information storage portions 38 and 39, an optimizing portion 40, first and second library storage portions 41 and 42, and a library generating portion 43.

The first program storage portion 31 is constructed with a storage medium, such as a semiconductor memory including ROM, RAM or so forth, a FD (floppy disk), a HD (hard disk), CD-ROM or the like. in the first program storage portion 31, a source program described by a programming language, such as C language or so forth, is stored preliminarily. In the shown embodiment, discussion will be given for the case where C language is used as the programming language.

The compiler 35 compiles the source program into a rearrangeable object program and thereafter transforms into rearrangeable object program which can be arranged, per a procedure to store in the second program storage portion 32. Here, rearrangeable object program is an object program which can be stored in any storage regions of the primary storage device. Also, arrangeable per procedure means that arrangement of the procedure can be done within the rearrangeable object program.

It should be noted that, in the shown embodiment, the procedure generally represents not only the procedure as originally means but also function and sub-routine, as set forth above. In the procedure, a user procedure, a user library procedure, a standard library procedure, a run-time library procedure and so forth are included.

Here, the user procedure is a procedure defined by the user in the source program. For example, when the user prepares the source program shown in FIG. 2, procedures func, func1 and func2 are all user procedures.

The user library procedure is originally the user procedure, and are considered to have high general applicability and thus are stored in the first library storage portion 41 after inspection, such as debugging or so forth. For example, when the source program is stored in the first library storage portion 41 with process, such as debugging or so forth after compiling the source program shown in FIG. 2 into the rearrangeable object program, all of the procedures func, func1 and func2 become user library procedure. The standard library procedure is the procedure preliminarily prepared in a processing system, such as compiler or so forth in the programming language describing the source program and can be used without definition by the user. For example, in C language, a procedure printf for outputting a character string as standard output, a procedure strlen returning a length of the character string and so forth are the standard library procedures.

The run-time library procedure is the procedure in a form preliminarily described by instruction code for large code size while general applicability is high and preliminarily stored in the first library storage portion 41. An instruction string having high general applicability and having large code size should lower efficiency if the compiler 35 generates the instruction code every time of generation of the object program. Therefore, such Instruction string is preliminarily established as the procedure described by the instruction code so that a code calling such procedure is generated upon generation of the object program. Then, such procedure is linked by the linker 36 later. For example, float type parameter or operation is described in the source program despite of the fact that the CPU or the like executing the final object program does not have instruction of floating decimal point, the compiler 35 generates the object program using the procedure consisted of a plurality of instruction strings, such as float procedure add, float procedure sub and so forth. The float procedure add or float procedure sub are run-time library procedures.

The second program storage portion 32 is constructed with the storage medium, such as semiconductor memory including RAM or the like, FD, HD and so forth and stores rearrangeable object program arrangeable per procedure.

The linker 36 establishes a link between the rearrangeable object program arrangeable per procedure and stored in the second program storage portion 32 and a rearrangeable library (which will be discussed later) arrangeable per procedure stored in the second library storage portion 42, to generate an executable temporary object program to store in the third program storage portion 33. In conjunction therewith, on the basis of the arrangement information (which will be discussed later) stored in the second information storage portion 39, a link is established between the rearrangeable object program arrangeable per procedure and the rearrangeable library arrangeable per procedure to generate an executable final object program to store in the fourth program storage portion 34.

The third program storage portion 33 is constructed with a storage medium, such as a semiconductor memory including RAM or so forth, FD, HD or so forth and stores the temporary object program. The fourth program storage portion 34 is constructed with a storage medium, such as a semiconductor memory including RAM or so forth, FD, HD or so forth and stores the final object program.

The profiler 37 is consisted of a hardware emulator, a software emulator and so forth and collects dynamic information (profile information) consisted of call relationship between procedures, call count of respective procedures, loop structure information and so forth with executing the temporary object program read out from the third program storage portion 33. Then, the dynamic information thus obtained is stored in the first information storage portion 38.

Here, the loop structure information is information indicating that a certain procedure is called in the look structure. Particularly, certain makers which enables recognition of starting and end of the look structure during operation of the profiler 37, are written in the loop structure of the source program. Then, recognizing the start and end of the look structure with the markers by the profiler 37, it can be recognized that the procedure called in the loop structure is in the loop structure. By this, it can be judged that possibility of sequential execution of the procedures within the loop structure is high.

The first information storage portion 38 is constructed with a storage medium, such as a semiconductor memory including RAM or so forth, FD, HD and so forth, and stores a dynamic information.

The optimizing portion 40 performs arrangement optimization of all procedure on the basis of the dynamic information stored in the first information storage portion 38 for avoiding conflict of the procedures having high possibility to be executed sequentially in time axis on the cache memory and for avoiding cache miss of the frequently used procedure. Also, the optimizing portion 40 generates an arrangement information for designating arrangement of the procedure to the linker 36 and stores the arrangement information thus generated in the second information storage portion 39.

The second information storage portion 39 is constructed with a storage medium, such as a semiconductor memory including RAM or so forth, FD, HD and so forth, aid stores the arrangement information.

The first library storage portion 41 is constructed with a storage medium, such as a semiconductor memory including ROM, RAM or so forth, FD, HD, CD-ROM or so forth and stores the rearrangeable libraries including the standard library procedure, the run-time library procedure and the user library procedure. Here, the rearrangeable library is rearrangeable object program. However, in order to distinguish from the rearrangeable object program generated by the compiler 35, the rearrangeable object program stored in the first library storage portion 41 is referred to as the rearrangeable library.

The library generating portion 43 transforms the rearrangeable library stored in the first library storage portion 41 into the rearrangeable library arrangeable per procedure to store in the second library storage portion 42. The second library storage portion 42 is constructed with the storage medium, such as the semiconductor memory including RAM or so forth, FD, HD or so forth and stores rearrangeable library arrangeable per procedure.

Next, operation of the program transformation system having the construction set forth above will be discussed with reference to FIGS. 3 to 10.

Figure 3:
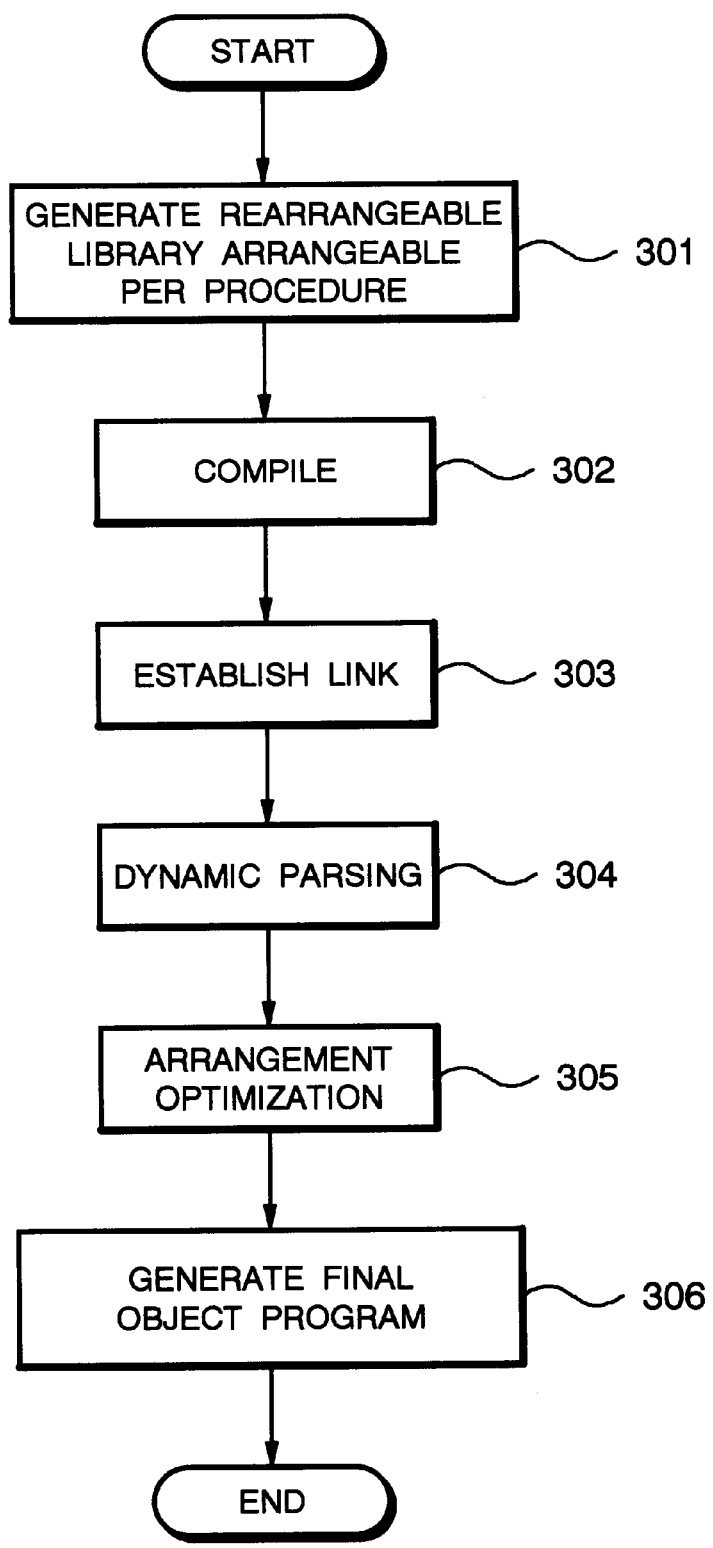
FIG. 3 is a flowchart showing operation of the first embodiment of the program transformation system of FIG. 4 is a flowchart showing an arrangement optimizing process of a procedure of an optimizing portion in the first embodiment of the program transformation system of FIG. 1.

At first, at step 301 shown in FIG. 3, the library generating port on 43 transforms each rearrangeable library scored in the first library storage portion 41 into rearrangeable library arrangeable per procedure, recognizing the procedure unit to store in the second library storage portion 42.

A plurality of procedures as one group in one rearrangeable library normally are included in a section, such as text section (.text. section) which is a unit of arrangement. These procedures are aggregated together as the text section upon linking in the linker 36. Each individual procedure cannot be arranged independently per the procedure. Therefore, by dividing each individual section into sections per individual procedure, each procedure can be appropriately arranged upon establishing link by the linker 36.

The process for dividing the text section within the rearrangeable library into the sections per the procedure will be discussed hereinafter.

At first, since a global attribute indicating that the own procedure is useful externally and symbol information relating to attribute of the procedure and so forth are added at the leading end of the procedure, these global attribute and the symbol information are recognized as a leading label for making reference to a leading address.

Next, on the basis of recognition of the leading label of each procedure, a section having distinct name per each procedure, such as "procedure name__source program, name" and so forth is newly generated. Then, information relating to the sections in the rearrangeable library is concentrically and newly registered in a certain portion, such as a section header portion, in the rearrangeable library. If the text section is not necessary in the rearrangeable library, the relevant information is deleted.

Since the rearrangeable library has an offset indicative of the position of various kinds of information in the rearrangeable library at respective portions, when the new section is added as set forth above, error is inherently caused in correspondence between the information and offset. Therefore, offset has to be updated. Each rearrangeable library processed as set forth above is stored in the second program storage portion 32 as rearrangeable library arrangeable per procedure.

At step 302, the compiler 35 compiles the source program into the rearrangeable object program, and thereafter, performs the process similar to the process of the library generating portion 43 at step 301 for transforming the rearrangeable library into the rearrangeable library arrangeable per procedure to store in the second program storage portion 32. At step 303, the linker 36 establishes a link between the rearrangeable object program arrangeable per procedure stored in the second program storage portion 32 and the rearrangeable library arrangeable per procedure stored in the second library storage portion 42 to generate executable temporary object program to store in the third program storage portion 33.

At step 304, the profiler 37 collects dynamic information consisted of call relationship between respective procedures, call counts of respective procedures, loop structure information and so forth with executing the temporary object program read out from the third program storage portion 33. The profiler 37 stores the dynamic information thus obtained in the first information storage portion 38.

At step 305, the optimizing portion 40 performs arrangement optimization for all procedures on the basis of the dynamic information stored in the first information storage portion 38 to generate the arrangement information to store in the second information storage portion 39. Detail of the arrangement optimization of the procedure will be discussed later.

At step 306, the linker 36 establishes a link between the rearrangeable object program arrangeable per procedure and the rearrangeable library arrangeable per procedure to generate the executable final object program to store in the fourth program storage portion 34. Thereafter, a sequence of process is terminated.

Next, arrangement optimization process of the procedure of the optimizing portion 40 will be discussed with reference to FIGS. 4 to 10.

There are various kinds of arrangement optimization methods of the procedure for efficiently using the cache memory. In the shown embodiment, arrangement method by cache line coloring disclosed in A. H. Hasemi, et al, "Efficient Procedure Mapping Using Cache Line Coloring", SIGPLAN, pp 171–182, June, 1997, is employed.

At first, as a premise, each code of the object program generated by the program transformation system and stored in the primary storage device is read out from the primary storage device and thereafter, stored in the cache memory consisted of four cache lines by the direct map method.

Figures 5, 6:
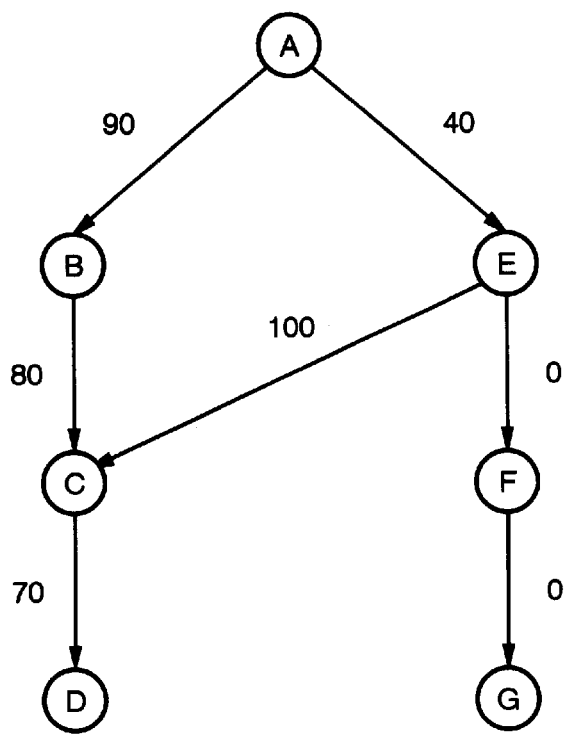
FIG. 5 is an illustration showing one example of number of cache lines to be occupied by procedures A to G.
FIG. 6 is an illustration showing one example of a procedure call graph to be generated by the optimizing portion.

In the source program to be compiled, seven procedures A to G are described in sequential order. When the source program is compiled into the object program, the code sizes of respective procedures A to G, number of cache lines to be occupied (cache line number) forming the cache memory is shown in FIG. 5.

On the other hand, as result of dynamic parsing in the profiler 37, it is assumed that frequency of call from the procedure A to the procedure B is "90", frequency of call from the procedure B to the procedure C is "80", frequency of call from the procedure C to the procedure D is "70, frequency of call from the procedure A to the procedure E is "40", frequency of call from the procedure E to the procedure C is "100", frequency of call from the procedure E to the procedure F is "0", and frequency of call from the procedure F to the procedure G is "0".

The arrangement method by cache line coloring reduces conflict on the cache memory in one generation (relationship of direct call from one procedure to the other procedure) using a procedure call graph which will be discussed later. In the arrangement method, "color" is assigned for each cache line, and arrangement of the procedure is performed using number of "colors" required for arrangement, namely cache line number, "colors" on which the procedures are arranged, and non-useable groups.

In the shown embodiment, read (r) is assigned for the first cache line, green (g) is assigned for the second cache line, blue (b) is assigned for the third cache line, and yellow (y) is assigned for the fourth cache line, respectively. The non-useable group are procedures in a relationship to call and to be called directly, and is referred to an aggregated group of the "colors" occupied by the already arranged procedures.

Figure 4:
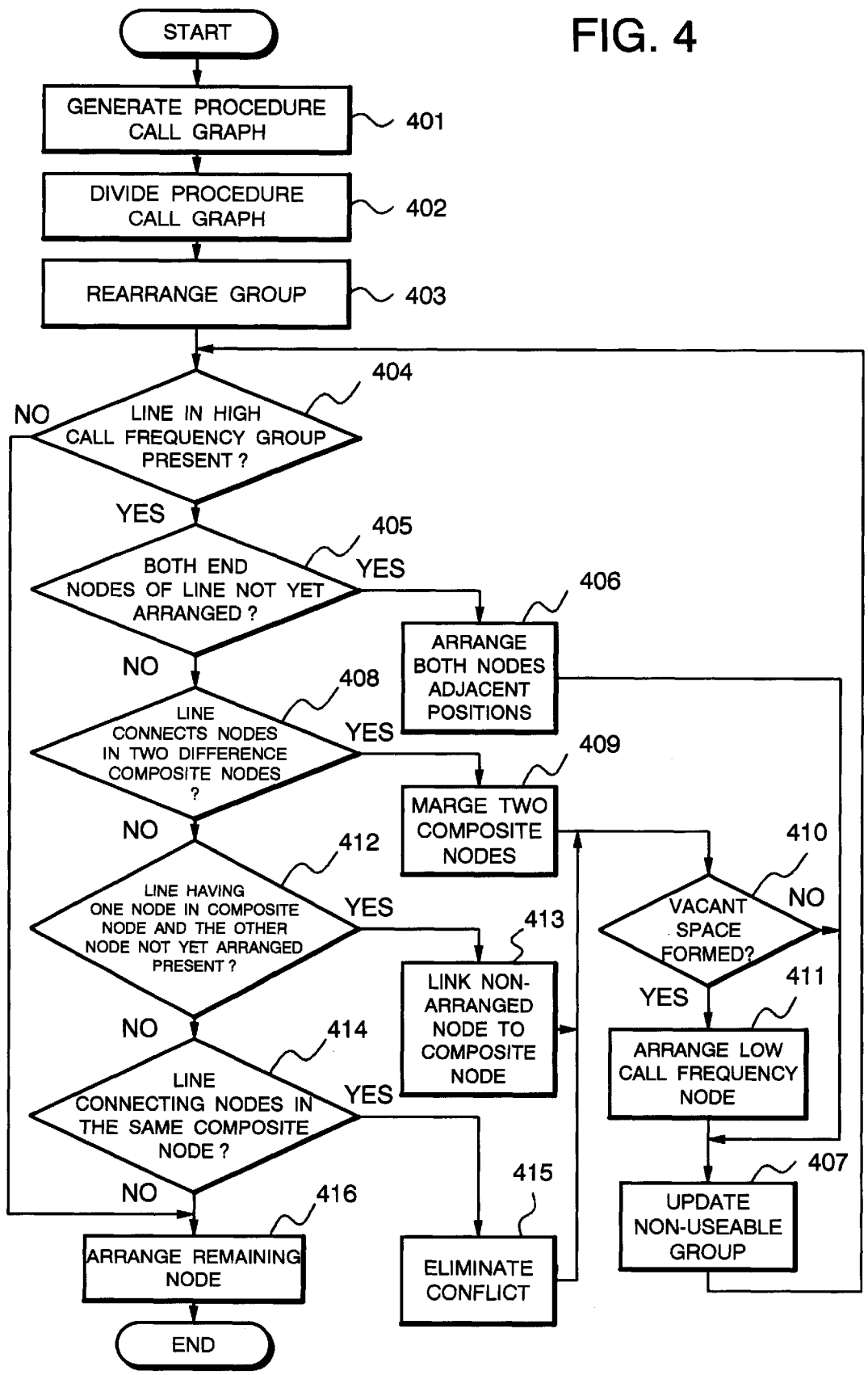

At first, at step 401 shown in FIG. 4, the optimizing portion 40 generates the procedure call graph as shown in FIG. 6 on the basis of the dynamic information stored in the first information storage portion 38. In FIG. 6, nodes A to G represent procedures. Lines between the nodes represent call relationship of the procedures. Numerical values added for the lines represent call frequency of the call from start point nodes, namely the procedures at the routes of arrows, to end point nodes, namely the procedures at the tip of the arrows.

At step 402, concerning the procedure call graph, lines and nodes are divided into a group having high call frequency and a group having low call frequency. In the shown embodiment, as can be appreciated from FIG. 6, the group having high call frequency is consisted of nodes A to E, the line from the node A to the node B, the line from the node A to the node E, the line from the node B to the node C, the line from the node C to the node D and the line from the node E to the node C. On the other hand, the group having low call frequency is consisted of the nodes F and G, the line from the node E to the node F and the line from the node F to the node G.

At step 403, the lines and the nodes are rearranged within each of the divided group. Namely, in the group having high call frequency, rearrangement is performed in descending order from the larger numerical values added to the lines. In contrast to this, in the group having low call frequency, rearrangement is performed in descending order from larger cache line number of the procedure and are arranged mainly for filling up void in the program space.

In the shown embodiment, as can be appreciated from FIG. 6, in the group having high call frequency, the lines are arranged in the sequential order of the line from the node E to the node C, the line from the node A to the node B, the line from the node B to the node C, the line from the node C to the node D and the line from the node A to the node E. On the other hand, in the group having low call frequency, as can be appreciated from FIG. 5, since the cache line number of the procedure G is 2 and the cache line number of the procedure F is 1, the nodes are arranged in sequential order of the node G and then the node F.

At step 404, judgment is made whether the line of the group of high call frequency is left or not. When the result of judgment is positive ("YES"), the process is advanced to step 405. At this time, since the process is executed at the first time, all lines are left. Therefore, the result of judgment becomes "YES".

At step 405, check is performed whether the nodes at both ends of the line at the highest order in the rearranged order among remaining lines are not yet arranged or not. If the result is YES, the process is advanced to step 406. In the shown case, the line of the highest order among the remaining lines is the line from the node E to the line C, and the process is executed at the first time, the nodes E and C at both ends are not yet arranged. Accordingly, the result of judgment becomes "YES".

At step 406, after arranging the nodes at both ends of the objective line adjacent with each other, the process is advanced to step 407. In this case, the nodes at both ends of the objective line can be arranged at arbitrary position in the program space. In this case, the cache line number of the procedures E and C are both 2, as can be appreciated from FIG. 5. As shown in the first row of FIG. 7, portions E1 and E2 of the procedure E are arranged on the first and second cache lines (colors are red (r) and green (g)). Portions C1 and C2 of the procedure C are arranged on the third and fourth cache lines (colors are blue (b) and yellow (y)). In this case, the nodes E and C are considered to be marged to form a single node. Such single node will be referred to as composite node E-C.

At step 407, after updating the groups which cannot be used, the process is returned to step 404.

In case of the node E, the "colors" of the cache lines, on which the node C is in a relationship to be directly called by the node E, are blue (b) and yellow (y), the non-useable group becomes E{b, y}. Similarly, in case of the node C, the "colors" of the cache lines, on which the node E is in a relationship to be directly called by the code C are red (r) and green (g). Therefore, the non-useable group becomes C{r, g}.

The processes of the steps 404 to 407 set forth above are repeated until no line which has the nodes at both ends left being not arranged, is left among the lines in the group having high call frequency. If not line is left in the group having high call frequency, the result of judgment at step 404 becomes "NO". Then, process is advanced to step 416. In this case, since the line from the node A to the node B is left and the nodes A and B at both ends of the line are not yet arranged, the processes at steps 406 and 407 are performed.

As can be appreciated from FIG. 5, both of the procedures A and B have cache line number 1. Therefore, as shown in the first row of FIG. 7, the procedure A is arranged on the third cache line (color is blue (b)), and the procedure B is arranged on the fourth cache line (color is yellow (y)). Then, the nodes A and B becomes a composite node A-B. Next, in case of the node A, the "color" of the cache line, on which the node B in a relationship to be directly called by the node A is yellow (y), the non-useable group becomes A{y}. Similarly, in case of the node B, the "color" of the cache line, on which the node A in a relationship to be directly called by the node B is blue (b), the non-useable group becomes B{b}.

It should be noted that, in the procedure call graph shown in FIG. 6, despite of the fact that the line from the node A to the node E is left, since the cache line of the colors red (r) and green (g), on which the node E is arranged in the non-useable group of the node A, are not included. This is because the line from the node A to the node A has not been processed for low order of the call frequency. In the current status, conflict can be caused in connection with the line from the node A to the node E, process is performed according to the order of the original line. Thus, the current status is acceptable.

On the other hand, when the line in the group having high call frequency is left but the node on either side of the left line has already being arranged, the result of judgment at step 405 becomes "NO". The process is advanced to step 408.

At step 408, check is performed whether the line as an object of process is the line connecting nodes in two different composite nodes. If the result of checking at step 408 is YES, the process is advanced to step 409. In the current condition, since the line directed from the node B to the node C, which line has the highest order among the remaining lines is the line connecting the composite node E-C and the composite node A-B, the result of judgment of the step 408 becomes YES. Therefore, the process is advanced to step 409.

At step 409, concerning the line as process object, two composite nodes are marged into a single composite node. This is done by coupling the composite node having smaller number of marged nodes (hereinafter referred to as "shorter composite node") among two composite nodes to the composite nodes having greater number of marged nodes (hereinafter referred to as "longer composite node). Upon coupling the shorter composite node to the longer composite node, the shorter composite node is coupled to the longer composite node even in the program space.

At first, it is determined which side of the longer composite node, the shorter composite node is to be arranged. Particularly, judgment is made among the nodes consisting the longer composite node, to which of the left and right boundary of the longer composite node, the center position of the nodes consisting the line to be the object for process is inclined, is judged by the cache line number required for reaching the left and right boundaries. Then, the shorter composite node is determined to be arranged on the side toward which the center position is inclined.

Next, an orientation to arrange the shorter composite node is determined and arranged. Particularly, the orientation of the shorter composite node is determined so that, among a plurality of nodes consisting the line to be object for process, the node other than the nodes consisting the longer composite node can be arranged as close as possible to the already arranged node in the longer composite node. In this case, if conflict is caused by arrangement of the shorter composite node, the positions of the nodes other than the nodes consisting the longer composite node are shifted away from the nodes consisting the longer composite node until the conflict is resolved. However, when the conflict cannot be avoided at any arrangement position of the nodes other than the nodes consisting the longer composite node, the arrangement positions of the nodes other than the nodes consisting the longer composite node are returned to the initial arrangement positions. Then, process is advanced to step 410.

In the shown embodiment, both of the composite nodes E-C and A-B have two marged nodes. Therefore, both of the composite nodes can be taken as shorter composite nodes. However, in the shown case, the composite node A-B is taken as the shorter composite node.

Among the nodes E and C consisting the longer composite node E-C, the center position of the node C forming the line directed from the node B to the node C, which line is object for process, is located between the portions C1 and C2 as shown in the first row of FIG. 7. Therefore, number of cache lines required for reaching to the left side boundary of the longer composite node E-C is three and whereas number of cache lines required for reaching to the right side boundary of the longer composite node E-C is one. Accordingly, the shorter composite node A-B is arranged on the right side of the longer composite node E-C.

Next, orientation of the shorter composite node A-B is determined so that among the nodes B and C forming the line directed from the node B to the node C, which line is an object for process, the node B other than the node C consisting the longer composite node E-C, is located as close as possible to the node C which has already been arranged. Thus, the composite node becomes B-A. Since no conflict is caused in the arrangement set forth above, the arrangement is maintained as is (see second row of FIG. 7). By this, new composite node E-C-B-A is generated.

At step 410, check is performed whether a vacant region is formed in the program space through the foregoing arrangement process or not. If the result of checking at step 410 is "NO", the process is advanced to step 407. In the shown case, since no vacant region is formed, the process is advanced to step 407. Then, after updating the non-useable group, the process is returned to step 404.

In case of the node A, since the "color" of the cache line on which the node B in relationship of direct call is arranged, is arranged, is red (r), the non-useble group becomes A{r}. Similarly, in case of the node B, since the "color" of the cache line on which the node A in relationship of direct call, is arranged, is green (g), and since the "color" of the cache line on which the node C in relationship of direct call, is arranged, is blue (b) and yellow (y), the non-useable group becomes B{g, b, y} (see second row of FIG. 7).

On the other hand, when the result of checking at step 410 is "YES", namely when the vacant region in the program space is formed through the foregoing arrangement process, the process is advanced to step 411.

At step 411, the node having high order in the group having low call frequency is arranged in the vacant region. Thereafter, process is advanced to step 407.

The processes at steps 404, 405, 408 to 411 and 407 as set forth above, are repeated until no line connecting the nodes in two mutually different composite nodes in the lines of the group having high call frequency and the node on either side has already been arranged, is found. Then, if no line of the group having high call frequency is left, the result of checking at step 404 becomes "NO". Then, the process is advanced to step 416.

If there is no line connecting the nodes in two mutually different composite nodes in the lines of the group having high call frequency and the node on either side has already been arranged, the result of checking at step 408 becomes "NO". Then, process is advanced to step 412.

Through the process set forth above, the line from the node E to the node C, the line from the node A to the node B and the line from the node B to the node C are processed. Therefore, in the group having high call frequency, the line from the node C to the node D and the line from the node A to the node E are left. However, these lines are not the line, in which one of the nodes has already been arranged and which does not connect two different composite nodes. Therefore, the result of checking at step 408 becomes "NO". Then, process is advanced to step 412.

At step 412, check is performed whether one node among two nodes consisting the line to be object for process consists the composite node, and the other node has not yet been arranged, or not. If the result of checking at step 412 is "YES", the process is advanced to step 413. In the present case, the line from the node C to the node D, which line has the highest order among the remaining lines, has the node C consisting the composite node E-C-B-A and the node D which is not yet arranged. Therefore, the result of checking at step 412 becomes "YES". Then, process is advanced to step 413.

At step 413, the non-arranged node of the line as object for process is coupled with the composite node. Upon coupling the non-arranged node to the composite node, the non-arranged node is also coupled with the composite node even on the program space.

At first, it is determined which side of the composite node, the non-arranged node is to be arranged. Particularly, judgment is made among the nodes consisting the composite node, to which of the left and right boundary of the composite node, the center position of the nodes consisting the line to be the object for process is inclined, is judged by the cache line number required for reaching the left and right boundaries. Then, the non-arranged node is determined to be arranged on the side toward which the center position is inclined.

In this case, if conflict is caused by arrangement of the non-arranged node, the positions of the nodes other than the nodes consisting the composite node are shifted away from the nodes consisting the composite node until the conflict is resolved. However, when the conflict cannot be avoided at any arrangement position of the nodes other than the nodes consisting the composite node, the arrangement positions of the nodes other than the nodes consisting the composite node are returned to the initial arrangement positions. Then, process is advanced to step 410.

Among the nodes E, C, B and A consisting the composite node E-C-B-A, the center position of the line from the node C to the node D, which line is object for process, is located between the portions C1 and C2 as shown in the first row of FIG. 7. Therefore, number of cache lines required for reaching to the left side boundary of the composite node E-C-B-A is three and whereas number of cache lines required for reaching to the right side boundary of the composite node E-C-B-A is three. Accordingly, the non-arranged node can be arranged on either of left and right side of the composite node E-C-B-A. In the shown case, the node D is determined to be arranged on left side of the composite node E-C-B-A.

In this case, when portions D1 and D2 of the nodes D are arranged on immediate left side of a portion E1 of the node E, conflict can be caused between the portions D1 and D2 of the node D and the portions C1 and C2 of the node C. Therefore, in order to avoid conflict, the D1 and D2 of the node D are arranged at a distance of two cache lines from the portion E1 of the node E (see third row of FIG. 7).

Next, in such case, vacant region corresponding to two cache lines is formed on the right side of the portions D1 and D2 of the node D. Then, the result of checking at step 410 becomes "YES". Thus, the process is advanced to step 411.

At step 411, in the vacant region for two cache lines on the right side of the portions D1 and D2 of the node D, the node having the highest order in the group having low call frequency is arranged. In the shown case, the node G is arranged in the vacant region set forth above (see fourth row in FIG. 7). Then, the process is advanced to step 407, after updating the non-useable group. Thereafter, the process is returned to step 404. In case of the node D, the "colors" of the cache lines, on which the node C is in a relationship to be directly called by the node D, are blue (b) and yellow (y), the non-useable group becomes D{b, y} (see third row of FIG. 7).

The processes at steps 404, 405, 408, 412, 413, 410, 411 and 407 as set forth above, are repeated until no line not connecting the nodes in two mutually different composite nodes but connecting one of the nodes on the opposite sides is the node consisting the composite node and the node on the other side is not yet arranged in the remaining lines of the group having high call frequency and the node on either side has already been arranged, is found. Then, if no line of the group having high call frequency is left, the result of checking at step 404 becomes "NO". Then, the process is advanced to step 416.

If no line which does not connect the nodes in two mutually different composite nodes but does connect one of the nodes on the opposite sides is the node consisting the composite node and the node on the other side is not yet arranged in the remaining lines of the group having high call frequency and the node on either side has already been arranged, is found. The result of checking at step 412 becomes "NO". Then, the process is advanced to step 413.

Through the process set forth above, the line from the node E to the node C, the line from the node A to the node B, the line from the node B to the node C and the line from the node C to the node D are processed. Therefore, in the group having high call frequency, only line from the node A to the node E is left. However, this lines are not the line, which does not connect the nodes in two mutually different composite nodes but does connect one of the nodes on the opposite sides is the node consisting the composite node and the node on the other side is not yet arranged in the remaining lines of the group having high call frequency and the node on either side has already been arranged. Therefore, the result of checking at step 412 becomes "NO". Then, process is advanced to step 414.

At step 414, check is performed whether one node among two nodes consisting the line to be object for process consists the composite node, and the other node has not yet been arranged, or not. If the result of checking at step 412 is "YES", the process is advanced to step 415. In the present case, the line from the node A to the node E, which line has the highest order among the remaining lines has both the nodes A and E consisting the composite iode E-C-B-A and the node E is not yet arranged. Therefore, the result of checking at step 414 becomes "YES". Then, process is advanced to step 415.

As step 415, conflict between the nodes consisting the line as object for process is eliminated. Namely, if conflict is caused between the nodes consisting the line as object for process, one of the nodes located closer to the boundary of the composite node is shifted beyond the boundary until conflict is resolved. However, when conflict cannot be avoided at any shift position of the node, the node is returned to the initially arranged position. Then, process is advanced to step 410.

In the shown embodiment, the line as object for process is the line from the node A to the node E. As can be appreciated from the fourth row of FIG. 7, conflict is caused between the nodes A and E. Among the nodes A and E consisting the line from the node A to the node E, the node A is closer to the boundary of the composite node E-C-B-A. Therefore, the node A is shifted beyond the boundary. In the shown case, since conflict can be avoided by shifting the node A for one cache line, the node A is arranged at the one cache line shifted position (see the fifth row of FIG. 7).

Next, in the shown case, the vacant region of one cache line is formed on the Tight side of the node A. Therefore, the result of judgments at step 410 becomes "YES". Then, the process is advanced to step 411.

At step 411, in the vacant region for one cache line on the right side of the node A, the node remained in the group having low call frequency is arranged. In the present case, after arranging the node F (see the sixth row of FIG. 7), the process is advanced to step 407. After updating the non-useable group, the process is returned to step 404. In case of the node A, the "colors" of the cache line, on which the nodes E and B in a relationship to be directly called by the node A are arranged, are red (r) and green (g), the non-useable group becomes A{r, g} (see fifth row of FIG. 7). Similarly, in case of the node B, the "color" of the cache line, on which the node C in a relationship of directly calling the node B and the node A in a relationship of being directly called by the node B, are arranged, are blue (b) and yellow (y). Thus, the non-useable group becomes B{b, y} (see the fifth row of FIG. 7).

The process of the steps 404, 405, 408, 412, 414, 415, 410, 411 and 407 set forth above is repeated until no line connecting the nodes in the same composite node is left. If no line in the group having high call frequency is left, the result of judgment at step 404 becomes "NO". Then, the process is advanced to step 416.

At step 416, concerning the remaining nodes in the group having low call frequency, arrangement is performed by simple depth preferential retrieval. When a plurality of composite nodes are arranged away from each other through the process set forth above, preference is given for each composite node on the basis of the call frequency to determine final arrangement. Then, a sequence of process goes END.

Figures 8, 9:
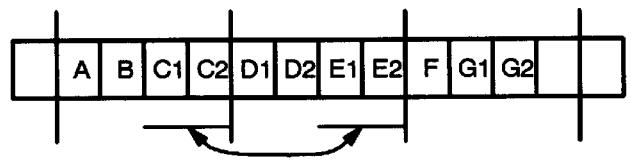
FIG. 8 is an illustration showing one example of an arrangement information.
FIG. 9 is an explanatory illustration for explaining drawback to be caused when the arrangement optimizing process of the procedure is not performed.

One example of the arrangement information to be obtained through the arrangement optimizing process of the procedures set forth above will be illustrated in FIG. 8.

As a premise, it is assumed that the procedures A and B are included in a source program file of a file name "test1.o", functions E, F and G are included in a source program file of a file name "test2.o", the procedures C and D are standard library procedures included in a library file of file name "libc.a". Also, a size of one cache line is assumed to be 32 bytes (0x20).

In FIG. 8, "GROUP1" is a segment name which is given in the case when the output section is handled as one group. "!LOAD" represents a segment type. This field is fixed. In the shown case, "LOAD" represents the segment to be loaded in the memory. "?RX" represents a segment attribute which shows attribute of read/write/execute of the segment. In case of an instruction portion (text code), it is fixed at "?RX". "A0×1000" represents alignment condition which represents the alignment condition upon arrangement of the segment in the memory space. In the shown case, there is illustrated the case where the alignment condition is "0×1000".

On the other hand, "_D_LIB", "_G_test2" and so forth are output section names which represent groups formed by coupling input sections of the same type and attribute. "$PROGBITS" represents the type of the input section. In case of the text code, the type of the input section is fixed to "$PROGBITS". "?AX" represents a section attribute which represents attribute of occupy/writeable/executable or so forth of the memory. In case of the text code, it is fixed at "?AX".

"A0×20" represents an alignment condition upon arranging the input section in the output section. Since consideration is given for the arrangement per cache line, the alignment condition is 0×20 as the size of one cache line. "_D_test1", "_G_test2" and so forth represent names of the input sections to be arranged in the output section. "libc.a", "test2.0" and so forth represent file names included in the input section. When the output section is formed by aggregating the same input sections of a plurality of files, it is possible to describe a plurality of file names.

As set forth above, by providing input section name per the procedure, the order of arrangement of the procedure can be designated with arrangement condition. As set forth above, with the construction of the shown embodiment, the library generating portion 43 for transforming the rearrangeable library into the rearrangeable library arrangeable per procedure is provided for collecting dynamic information with respect to all procedures upon dynamic parsing by the profiler 37, generates the arrangement information determining the optimal arrangement for all of the procedures on the basis of the dynamic information and arranges all procedures on the basis of the arrangement information. Therefore, conflict on the cache memory between all procedures consisting the object program can be reduced. In conjunction therewith, cache miss of frequently used procedure can be reduced. By this, execution speed can be speeded up upon execution of the object program by the computer or CPU.

In this respect, when seven procedures are included in the source program to be compiled and described in the sequential order, number of cache lines of respective procedures A to G when the source program is complied into the object program, are as shown in FIG. 5, if the arrangement optimization process of the procedure by the optimizing portion 40 is not provided at all, the procedures A to G in the source program is compiled into the object program in the described order. Therefore, conflict is caused between the procedures C and E as shown in FIG. 9.

Figures 10, 18:
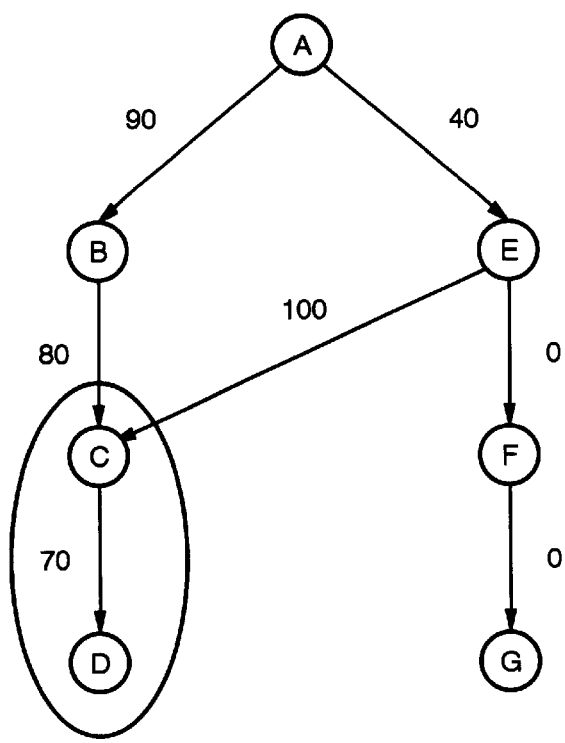
FIG. 10 is an illustration showing the case where procedures C and D in the procedure call graph of FIG. 6 are standard library procedure.
FIG. 18 is an illustration showing one example of the case where a source program to be used in the prior art is expressed by C language.

On the other hand, in the present invention, without distinguishing the kinds of the procedures, all procedures are handled equally and arrangement is possible per procedures, possibility of completely eliminating conflict can be high. In procedure call graph shown in FIG. 6, as shown in FIG. 10, the procedures C and D are standard library procedures. As in the prior art, if these procedures C and D are placed to be out of object for arrangement optimization process of the procedure, even when the arrangement method by cache line coloring as disclosed in the above-identified publication, it is not possible to completely avoid conflict for the reason set out below. When a call instruction of a plurality of standard library procedures are described in the source program, a plurality of corresponding standard library procedures are read out from the library storage portion upon establishing a link in the linker and are concentrically arranged in the special region of the primary storage device in the prior art. It has been not possible to designate the arrangement per procedure.

Figure 11:
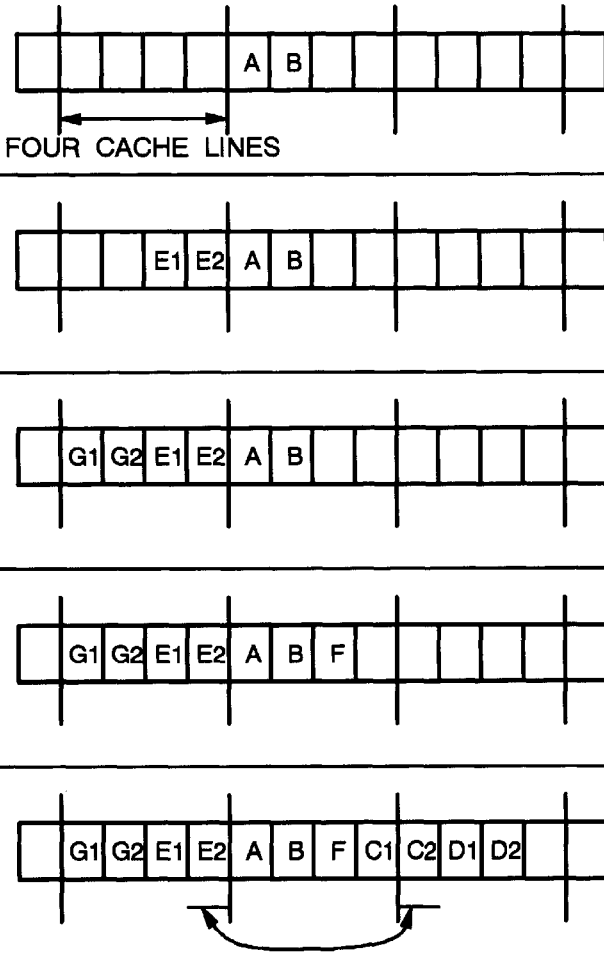
FIG. 11 is an illustration for explaining drawback in the case where the standard library procedure is placed out of object for the arrangement optimizing process of the procedure.

FIG. 11 shows a process of the arrangement optimization process of the procedure by the optimizing portion in the case where the standard library procedures C and D are placed out of arrangement optimization process of the procedure. In this case, since the standard library procedures C and D are placed out of arrangement optimization process, the line from the procedure E to the procedure C and the line from the procedure B to the procedure C are naturally placed out of process. Accordingly, as shown in the fifth row of FIG. 11, conflict of the procedure E and the procedure C can be avoided.

(Second Embodiment)

Next, discussion will be given for the second embodiment of the program transformation system according to the present invention.

Figure 12:
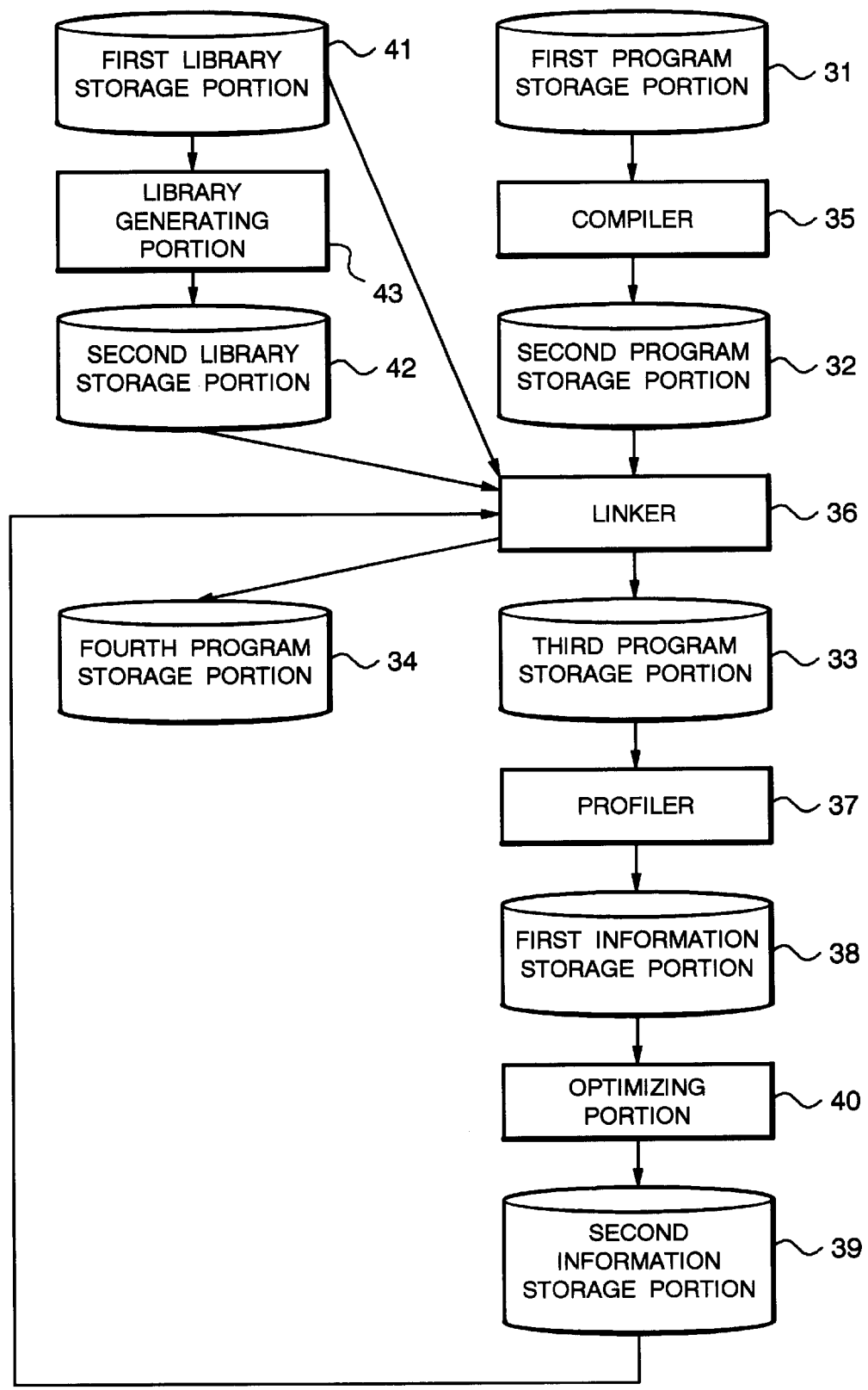
FIG. 12 is a block diagram showing a construction of the second embodiment of a program transformation system according to the present invention.

FIG. 12 is a block diagram showing a construction of the second embodiment of the program transformation system according to the present invention. In FIG. 12, like elements to those illustrated in FIG. 1 will be identified by like reference numerals and detailed discussion for such common element will be neglected in order to avoid redundant disclosure for keeping the disclosure simple enough to facilitate clear understanding of the present invention.

In the shown embodiment of the program transformation system shown in FIG. 12, the rearrangeable library stored in the first library storage portion 41 is also supplied to the linker 36 in addition to the library generating portion 43. The following is the reason why such construction is provided.

Namely, when number of the rearrangeable libraries is large, it takes a long period for transforming all of the rearrangeable libraries stored in the first library storage portion 41 into the rearrangeable libraries arrangeable per procedure.

Therefore, concerning a part of the rearrangeable libraries, without transforming the rearrangeable libraries into the rearrangeable libraries arrangeable per procedure by the library generating portion 43, direct link to the rearrangeable libraries arrangeable per procedure is established by the linker 36.

In this case, the rearrangeable library to be directly supplied to the linker 36 may be judged by the linker 36 on the basis of the dynamic information stored in the first information storage portion 38 or the code size of each procedure, for example.

As set forth above, with the construction set forth above, the final object program can be generated at a shorter period than that in the first embodiment.

(Third Embodiment)

Next, discussion will be given for the third embodiment of the program transformation system according to the present invention.

Figure 13:
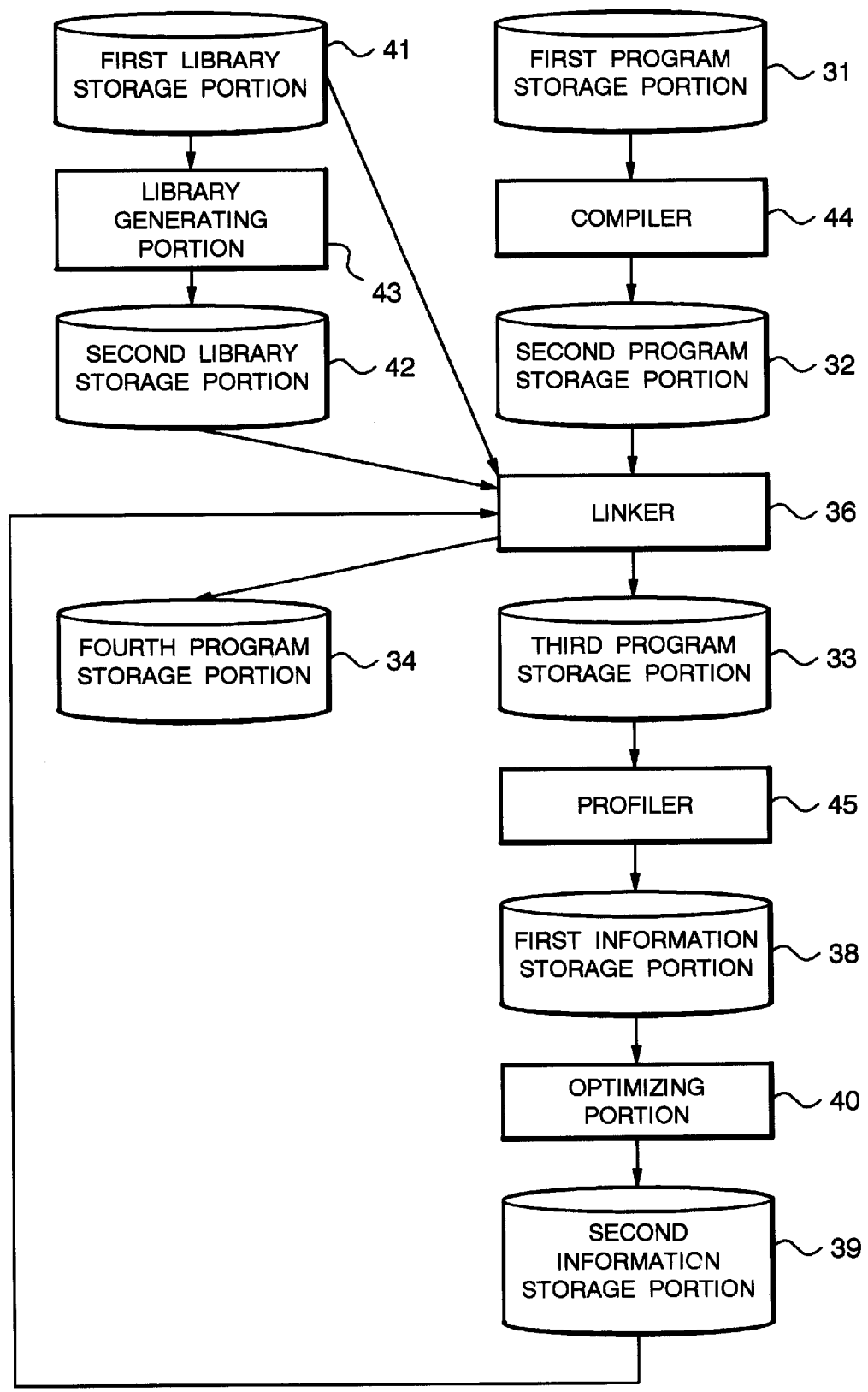
FIG. 13 is a block diagram showing a construction of the third embodiment of a program transformation system according to the present invention.

FIG. 13 is a block diagram showing a construction of the third embodiment of the program transformation system according to the present invention. In FIG. 13, like elements to those illustrated in FIG. 12 will be identified by like reference numerals and detailed discussion for such common element will be neglected in order to avoid redundant disclosure for keeping the disclosure simple enough to facilitate clear understanding of the present invention.

In the third embodiment of the program transformation system, in place of the compiler 35 and the profiler 37 shown in FIG. 12, a compiler 44 and a profiler 45 are newly provided.

Different from the profiler 37 shown in FIG. 12, the profiler 45 has only function for simply reading the executable temporary object program stored in the third program storage portion 33 and executing the read out temporary object program. On the other hand, the compiler 44 inserts a count code counting number of times of procedures to be actually executed upon executing the temporary object program by the profiler 45 to the temporary object program upon compiling the source program into the executable temporary object program. BY this, the profiler 45 can collect dynamic information consisted of call relationship between the procedures, call counts of respective procedures and so forth by executing the temporary object program, and stores the obtained dynamic information in the first information storage portion 38.

Next, discussion will be given for operation of the third embodiment oil the program transformation system constructed as set forth above with reference to FIG. 14.

Figure 14:
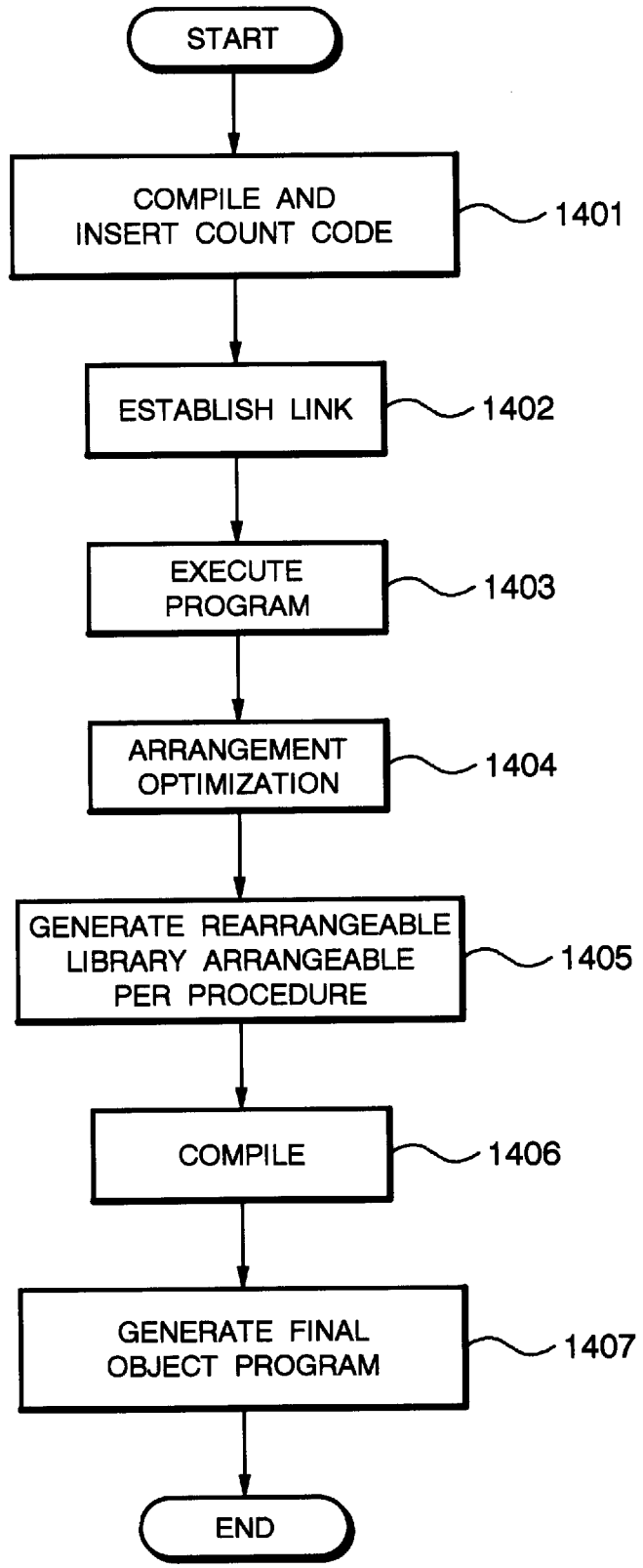
FIG. 14 is a flowchart showing operation of the third embodiment of the program transformation system of FIG. 13.
Figure 15:
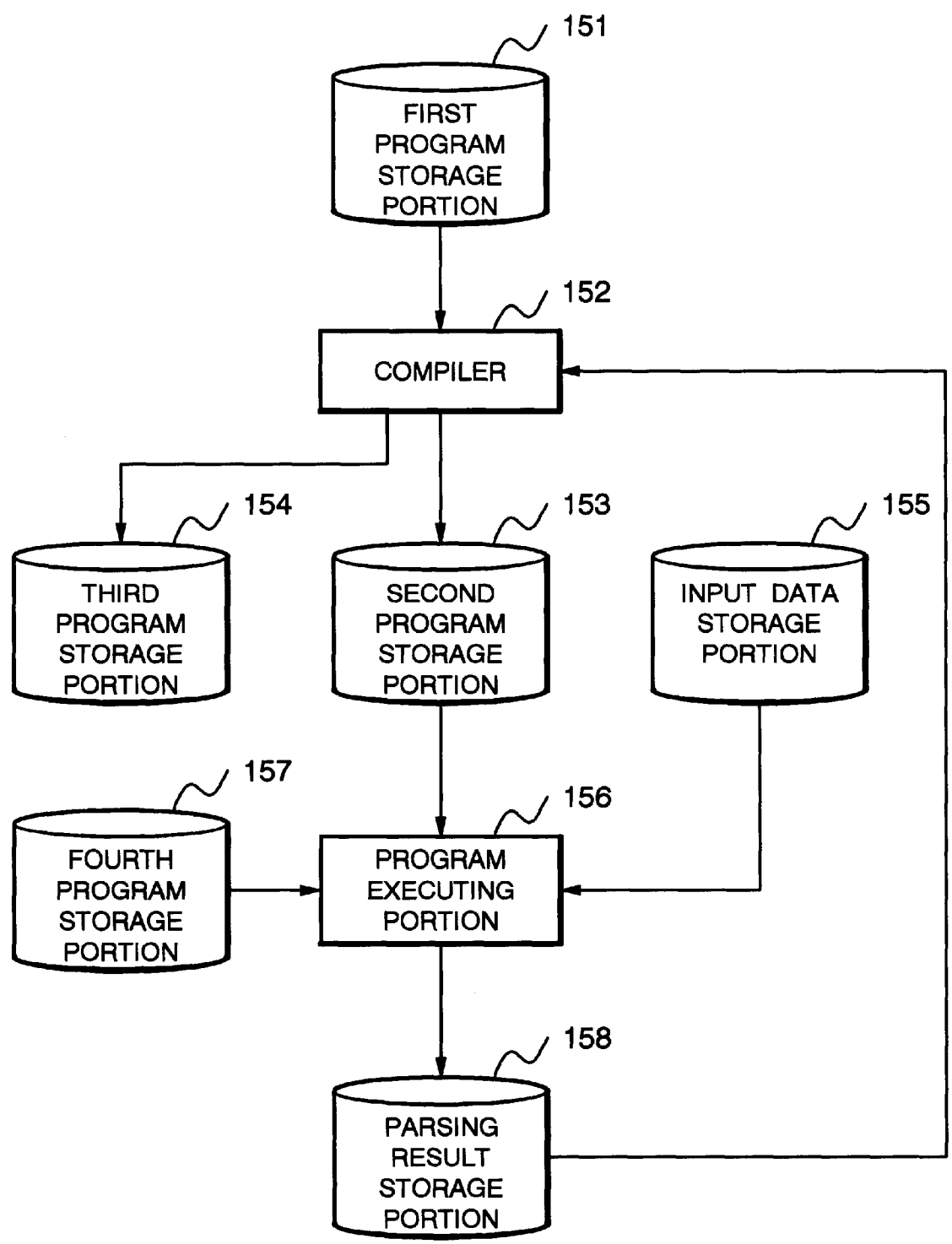
FIG. 15 is a block diagram showing a first example of the construction of the conventional program transformation system.
Figure 16:
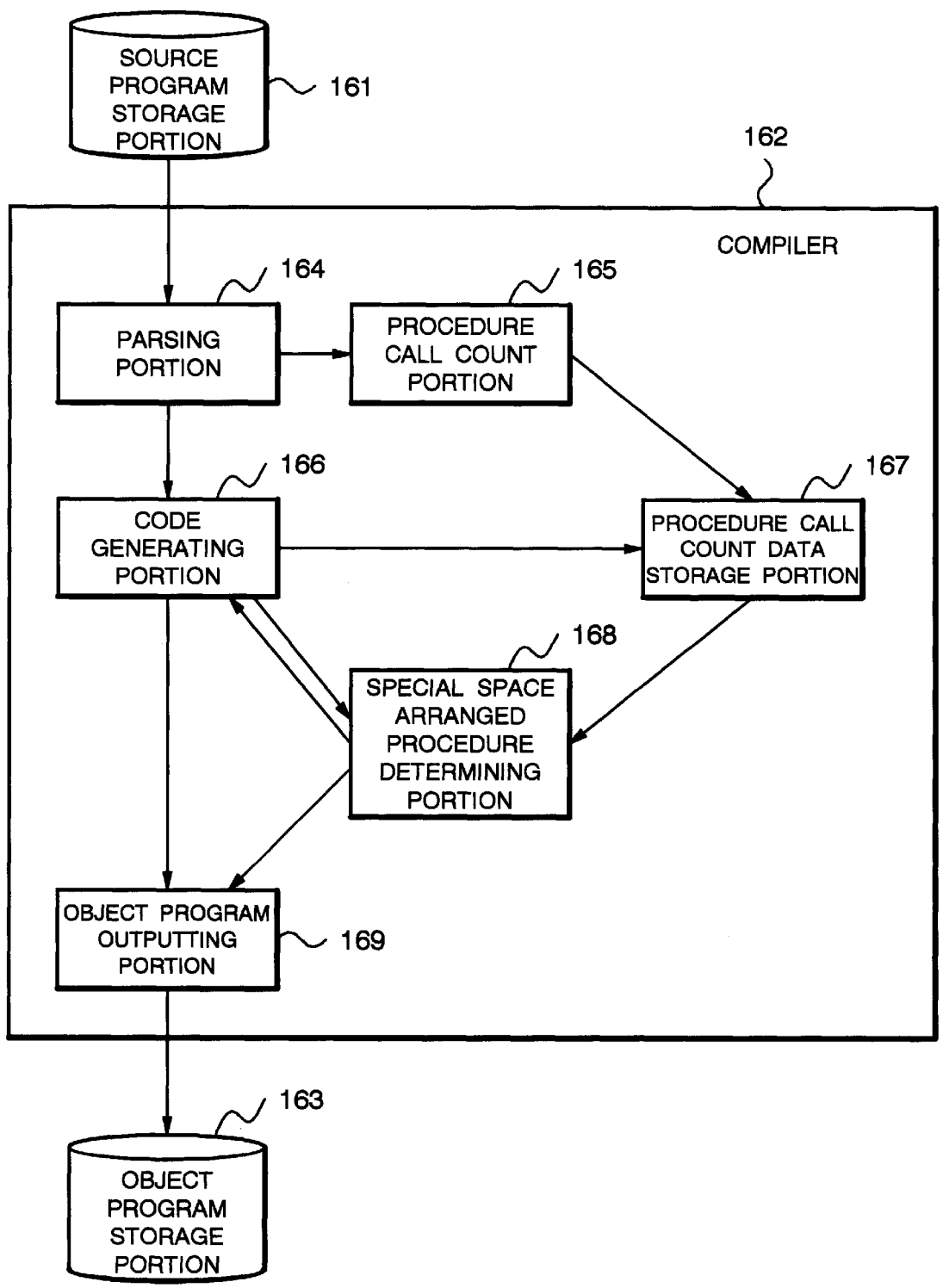
FIG. 16 is a block diagram showing a second example of the construction of the conventional program transformation system.
Figure 19:
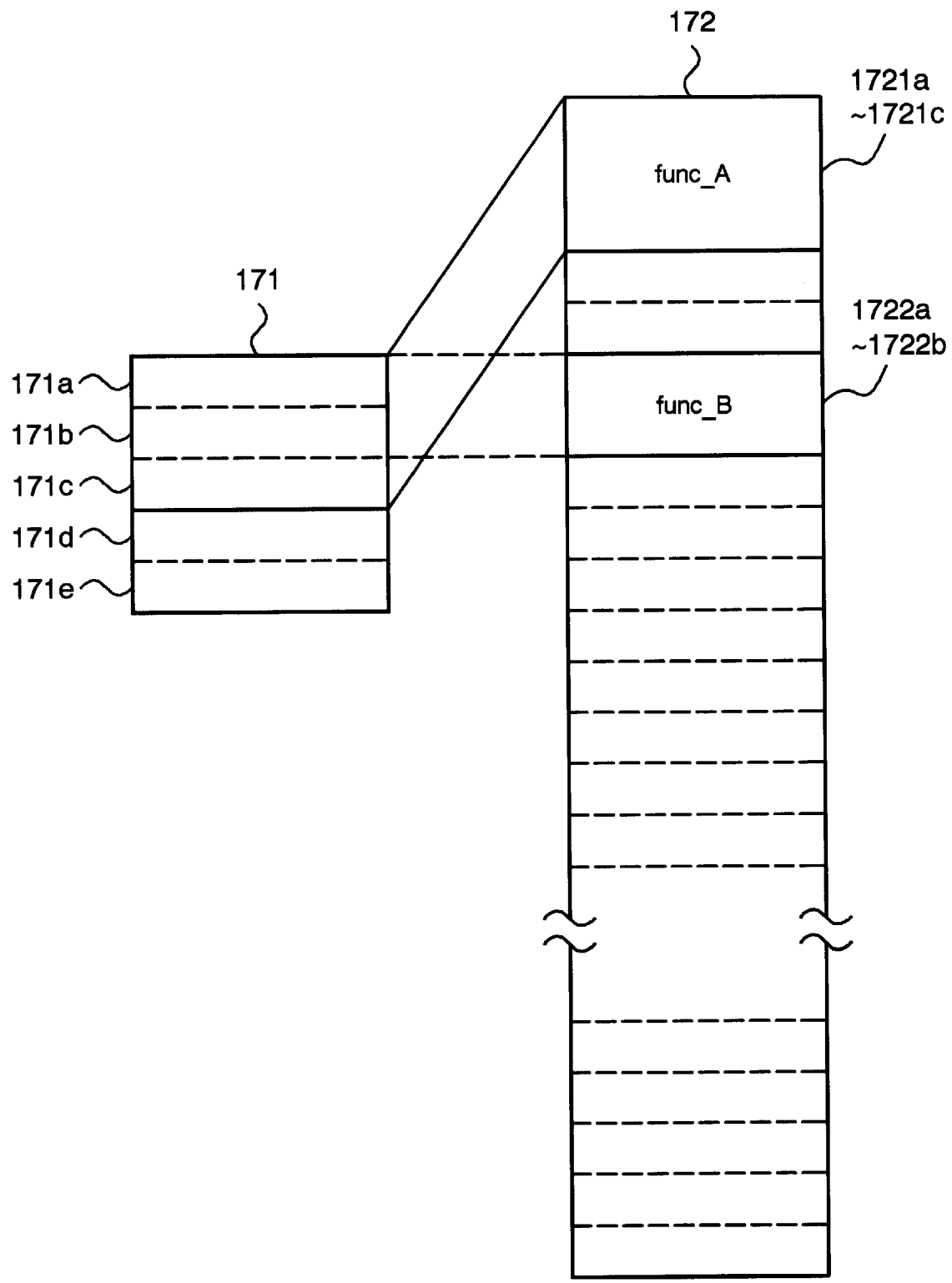
FIG. 19 is an explanatory illustration for explaining conflict between procedure on a cache memory.

At first, at step 1401 shown in FIG. 14, the compiler 44 complies the source program (see FIG. 2) read out from the first program storage portion 31 into the executable temporary object program with inserting the count code to store in the second program storage portion 32.

At step 1402, the linker 36 establishes a link between the temporary object program inserted the count code stored in the second program storage portion 32 and the rearrangeable library stored in the first library storage portion 41 to generate an executable temporary object program to store in the third program storage portion 33.

At step 1403, the profiler 45 executes the temporary object program read out from the third program storage portion 33. In this case, since the count code is inserted in the temporary object program, dynamic information consisted of call relationship between the procedures, call count of each procedure and so forth are collected. The obtained dynamic information is stored in the first information storage portion 38.

At step 1404, the optimizing portion 40 generates the arrangement information by performing arrangement optimization for all procedures on the bais of the dynamic information stored in the first information storage portion 38 to store in the second information storage portion 39. The process of the step 1404 is substantially similar to the process of the step 305 in the first embodiment. Thus, detailed discussion for this step will be neglected in order to avoid redundant disclosure for keeping the disclosure simple enough to facilitate clear understanding of the present invention.

At step 1405, the library generating portion 43 transforms each rearrangeable library stored in the first library storage portion 41 into the rearrangeable library arrangeable per procedure by recognizing per procedure to store in the second library storage portion 42. The process of the step 1405 substantially similar to the process at step 301 in the first embodiment. Thus, detailed discussion for this step will be neglected in order to avoid redundant disclosure for keeping the disclosure simple enough to facilitate clear understanding of the present invention.

At step 1406, the compiler 35 compiles the source program into the rearrangeable object program and thereafter transforms into the rearrangeable object program arrangeable per procedure in the similar process to the process of the library generating portion 43 at step 1405, to store in the second program storage portion 32.

At step 1407, the linker 36 establishes a link between the rearrangeable object program arrangeable per procedure and the rearrangeable library arrangeable per procedure on the basis of the arrangement information stored in the second information storage portion 39 to generate the executable final object program to store in the fourth program storage portion 34. Thereafter, the sequence of process goes END.

With the construction of the shown embodiment set forth above, even if the profiler 45 does not have a function for collecting dynamic information, substantially the same effect to the first embodiment can be obtained.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For example, while the present invention has been illustrated and discussed in terms of an example as applied for generating one final object program from one source program in the foregoing embodiment, the present invention should not be limited to the disclosed embodiments. Namely, the present invention is applicable for the case where a plurality of source programs are complied into respective rearrangeable object programs and then thus generated rearrangeable object programs are linked by the linker 36 to generate one final object program, as a matter of course.

On the other hand, in respective embodiments set forth above, respective program storage portions 31 to 34, respective information storage portions 38 and 39 and library storage portions 41 and 42 are constructed with mutually different storage media. However, the present invention is not limited to the shown embodiments. Namely, respective storage portions may be formed by different storage regions of a common storage medium.

In this case, respective program storage portions 31 to 34 and library storage portions 41 and 42 are programs or rearrangeable libraries requiring relatively large storage capacity and thus may be constructed with FD, HD or CD-ROM/ On the other hand, since respective information storage portions 38 and 39 are data requiring relatively small storage capacity, these information storage portions 38 and 39 may be former with the semiconductor memory, such as RAM, ROM or so forth.

On the other hand, respective means in the foregoing embodiments are illustrated as hardware construction. The present invention should not be limited to the constructions shown in the illustrated embodiments. Namely, it is possible to form the program transformation system with a computer having CPU (central processing unit), an internal storage device, such as ROM, RAM or so forth, an external storage device, such as FDD (floppy disk drive), HDD (hard disk drive), CD-ROM drive and so forth, output means and input means, and the foregoing compilers 35 and 44, the linker 36 and the profilers 37 and 45 may be constructed with CPU, and a program transformation program realizing the foregoing functions may be stored in the storage medium, such as the semiconductor memory including ROM or the like, FD, HD, CD-ROM or so forth.

In this case, the foregoing internal storage device or the external storage device serves as respective program storage portions 31 to 34, respective information storage portions 38 and 39 and the library storage portions 41 and 42. The program transforming program is loaded to CPU from the storage medium to control CPU operation. CPU is responsive to triggering of the program transforming program to serve as the compilers 35 and 44, the linkers 36 and the profilers 37 and 45. Under control of the program transforming program, the foregoing process is executed.

As set forth above, with the construction of the present invention as set forth above conflict between various procedures on the cache memory can be avoided. Also, cache miss of the frequently used procedure can be prevented. By this, upon execution of the computer or CPU, execution speed can be accelerated.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A program transformation method for transforming a source program described by a programming language into an object program described by a language executable by a data processing system, comprising:

first process of transforming at least a part of procedure, function or sub-routine used in said source program into a form so that said object program can be stored in an arbitrary storage region of a primary storage device of said data processing system;

second process of arranging procedure, function or sub-routine transformed or not transformed in said first process in said storage region corresponding to cache line of a cache memory among storage region of said primary storage device without causing cache conflict on the basis of information relating to said procedure, function or sub-routine obtained during a process of transformation of said source program into said object program; and third process of generating said object program, on the basis of the result of arrangement.

2. A program transformation method as set forth in claim 1, wherein said procedure, function or sub-routine is at least one of that defined by a user in said source program, that defined and inspected by the user, that preliminarily prepared in a processing system in said programming language and that preliminarily prepared in a form of instruction code.

3. A program transformation method as set forth in claim 1, wherein said information is obtained by execution of a temporary object program transformed from said source program and is consisted of information indicative of number of times that said procedure, function or sub-routine is actually called and information indicative of call relationship between procedures, functions or sub-routines.

4. A program transformation method as set forth in claim 1, wherein said information is obtained by execution of a temporary object program transformed from said source program and is consisted of information indicative of number of times that said procedure, function or sub-routine is actually called and information indicative of call relationship between procedures, functions or sub-routines, in said second process, said procedures, functions or sub-routines are divided into a plurality of groups on the basis of call frequency, and said procedures, functions or sub-routines are arranged in said storage region corresponding to cache lines of a cache memory among the storage region of said primary storage device.

5. A program transformation method for transforming a source program described by a programming language into an object program described by a language executable by a data processing system, comprising:

first process of transforming at least a part of procedure, function or sub-routine used in said source program into a form for storing in an arbitrary storage region of a primary storage device of said data processing system when said object program is used in said data processing system;

second process of transforming said source program into said object program, and in conjunction therewith, and concerning said object program, transforming procedure, function or sub-routine defined by a user in said source program into a form storable in arbitrary region of said primary storage device;

third process of linking the procedure, function or sub-routine transformed into said first process and the object program obtained in said second process;

fourth process of collecting dynamic information consisted of information indicative of number of times that the procedure, function or sub-routine is actually called, and information indicative of call relationship between said procedure, function or sub-routine with executing the object program obtained through said third process;

fifth process of arranging said procedure, function or sub-routine in said storage region corresponding to the cache line of the cache memory among the storage region of said primary storage device with avoiding cache conflict, on the basis of said dynamic information; and sixth process of generating a final object program by linking said procedure, function or sub-routine transformed in said first process and the object program obtained in said second process, on the basis of said arrangement information.

6. A program transformation method as set forth in claim 5, wherein said procedure, function or sub-routine is at least one of that defined by a user in said source program, that defined and inspected by the user, that preliminarily prepared in a processing system in said programming language and that preliminarily prepared in a form of instruction code.

7. A program transformation method as set forth in claim 5, wherein in said second process, said procedures, functions or sub-routines are divided into a plurality of groups on the basis of call frequency, and said procedures, functions or sub-routines are arranged in said storage region corresponding to cache lines of a cache memory among the storage region of said primary storage device.

8. A program transformation method for transforming a source program described by a programming language into an object program described by a language executable by a data processing system, comprising:

first process of transforming said source program into a temporary object program, and in conjunction therewith, upon executing said temporary object program, inserting a code for counting number of times that said procedure, function or sub-routine is actually called;

second process of linking one of the procedure, function or sub-routine that defined by a user in said source program, that defined and inspected by the user, that preliminarily prepared in a processing system in said programming language and that preliminarily prepared in a form of instruction code, with said temporary object program obtained through said first process;

third process of collecting dynamic information consisted of information indicative of number of times that the procedure, function or sub-routine is actually called, and information indicative of call relationship between said procedure, function or sub-routine with executing the object program obtained through said second process;

fourth process of arranging said procedure, function or sub-routine in said storage region corresponding to the cache line of the cache memory among the storage region of said primary storage device with avoiding cache conflict, on the basis of said dynamic information; and fifth process of transforming at least part of one defined by a user in said source program, one defined and inspected by the user, one preliminarily prepared in a processing system in said programming language and one preliminarily prepared in a form of instruction code among the procedure, function or sub-routine to be used in said source program into a form storable in an arbitrary storage region of said primary storage region, in which said object program is stored as actually used in said data processing system;

sixth process, after transforming said source program into said object program, concerning said object program, transforming procedure, function or sub-routine defined by a user in said source program into a form storable in arbitrary region of said primary storage device;

seventh process of generating a final object program by linking said procedure, function or sub-routine transformed in said fifth process and the object program obtained in said sixth process, on the basis of said arrangement information.

9. A program transformation method as set forth in claim 8, wherein in said fourth process, said procedures, functions or sub-routines are divided into a plurality of groups on the basis of call frequency, and said procedures, functions or sub-routines are arranged in said storage region corresponding to cache lines of a cache memory among the storage region of said primary storage device.

10. A program transformation system for transforming a source program described by a programming language into an object program described by a language executable by a data processing system, comprising:

procedure transforming means for transforming at least a part of procedure, function or sub-routine used in said source program into a form so that said object program can be stored in an arbitrary storage region of a primary storage device of said data processing system;

optimizing means for arranging procedure, function or sub-routine transformed or not transformed in said procedure transforming means in said storage region corresponding to cache line of a cache memory among storage region of said primary storage device without causing cache conflict on the basis of information relating to said procedure, function or sub-routine obtained during a process of transformation of said source program into said object program; and generating means for generating said object program, on the basis of the result of arrangement.

11. A program transformation system as set forth in claim 10, wherein said procedure, function or sub-routine is at least one of that defined by a user in said source program, that defined and inspected by the user, that preliminarily prepared in a processing system in said programming language and that preliminarily prepared in a form of instruction code.

12. A program transformation system as set forth in claim 10, wherein said information is obtained by execution of a temporary object program transformed from said source program and is consisted of information indicative of number of times that said procedure, function or sub-routine is actually called and information indicative of call relationship between procedures, functions or sub-routines.

13. A program transformation system as set forth in claim 10, wherein said information is obtained by execution of a temporary object program transformed from said source program and is consisted of information indicative of number of times that said procedure, function or sub-routine is actually called and information indicative of call relationship between procedures, functions or sub-routines, in said optimizing means, said procedures, functions or sub-routines are divided into a plurality of groups on the basis of call frequency, and said procedures, functions or sub-routines are arranged in said storage region corresponding to cache lines of a cache memory among the storage region of said primary storage device.

14. A program transformation system for transforming a source program described by a programming language into an object program described by a language executable by a data processing system, comprising:

procedure transforming means for transforming at least a part of procedure, function or sub-routine used in said source program into a form for storing in an arbitrary storage region of a primary storage device of said data processing system when said object program is used in said data processing system;

program transforming means for transforming said source program into said object program, and in conjunction therewith, and concerning said object program, transforming procedure, function or sub-routine defined by a user in said source program into a form storable in arbitrary region of said primary storage device;

linking means for linking the procedure, function or sub-routine transformed into said procedure transforming means and the object program obtained in said program transforming means;

dynamic information collecting means for collecting dynamic information consisted of information indicative of number of times that the procedure, function or sub-routine is actually called, and information indicative of call relationship between said procedure, function or sub-routine with executing the object program obtained through said linking means; and optimizing means for arranging said procedure, function or sub-routine in said storage region corresponding to the cache line of the cache memory among the storage region of said primary storage device with avoiding cache conflict, on the basis of said dynamic information;

said linking means generating a final object program by linking said procedure, function or sub-routine transformed in said procedure transforming means and the object program obtained in said program transforming means, on the basis of said arrangement information.

15. A program transformation system as set forth in claim 14, wherein in said optimizing means, said procedures, functions or sub-routines are divided into a plurality of groups on the basis of call frequency, and said procedures, functions or sub-routines are arranged in said storage region corresponding to cache lines of a cache memory among the storage region of said primary storage device.

16. A program transformation system for transforming a source program described by a programming language into an object program described by a language executable by a data processing system, comprising:

program transforming means for transforming said source program into a temporary object program, and in conjunction therewith, upon executing said temporary object program, inserting a code for counting number of times that said procedure, function or sub-routine is actually called;

linking means for linking one of the procedure, function or sub-routine that defined by a user in said source program, that defined and inspected by the user, that preliminarily prepared in a processing system in said programming language and that preliminarily prepared in a form of instruction code, with said temporary object program obtained through said program transforming means;

dynamic information collecting means for collecting dynamic information consisted of information indicative of number of times that the procedure, function or sub-routine is actually called, and information indicative of call relationship between said procedure, function or sub-routine with executing the object program obtained through said linking means;

optimizing means for arranging said procedure, function or sub-routine in said storage region corresponding to the cache line of the cache memory among the storage region of said primary storage device with avoiding cache conflict, on the basis of said dynamic information; and procedure transforming means for transforming at least part of one defined by a user in said source program, one defined and inspected by the user, one preliminarily prepared in a processing system in said programming language and one preliminarily prepared in a form of instruction code among the procedure, function or sub-routine to be used in said source program into a form storable in an arbitrary storage region of said primary storage region, in which said object program is stored as actually used in said data processing system;

said program transforming means transforming said source program into said object program, concerning said object program, transforming procedure, function or sub-routine defined by a user in said source program into a form storable in arbitrary region of said primary storage device, and said linking means generating a final object program by linking said procedure, function or sub-routine transformed in said procedure transforming means and the object program obtained in said program transforming means, on the basis of said arrangement information.

17. A program transformation system as set forth in claim 16, wherein in said optimizing means, said procedures, functions or sub-routines are divided into a plurality of groups on the basis of call frequency, and said procedures, functions or sub-routines are arranged in said storage region corresponding to cache lines of a cache memory among the storage region of said primary storage device.

18. A computer readable memory storing a language processing program for transforming a source program described by a programming language into an object program described by a language executable by a data processing system, said language processing program comprising:

first process of transforming at least a part of procedure, function or sub-routine used in said source program into a form so that said object program can be stored in an arbitrary storage region of a primary storage device of said data processing system;

second process of arranging procedure, function or sub-routine transformed or not transformed in said first process in said storage region corresponding to cache line of a cache memory among storage region of said primary storage device without causing cache conflict on the basis of information relating to said procedure, function or sub-routine obtained during a process of transformation of said source program into said object program; and third process of generating said object program, on the basis of the result of arrangement.

19. A computer readable memory as set forth in claim 18, wherein said information is obtained by execution of a temporary object program transformed from said source program and is consisted of information indicative of number of times that said procedure, function or sub-routine is actually called and information indicative of call relationship between procedures, functions or sub-routines, in said second process, said procedures, functions or sub-routines are divided into a plurality of groups on the basis of call frequency, and said procedures, functions or sub-routines are arranged in said storage region corresponding to cache lines of a cache memory among the storage region of said primary storage device.

20. A computer readable memory storing a language processing program for transforming a source program described by a programming language into an object program described by a language executable by a data processing system, said language processing program comprising:

first process of transforming at least a part of procedure, function or sub-routine used in said source program into a form for storing in an arbitrary storage region of a primary storage device of said data processing system when said object program is used in said data processing system;

second process of transforming said source program into said object program, and in conjunction therewith, and concerning said object program, transforming procedure, function or sub-routine defined by a user in said source program into a form storable in arbitrary region of said primary storage device;

third process of linking the procedure, function or sub-routine transformed into said first process and the object program obtained in said second process;

fourth process of collecting dynamic information consisted of information indicative of number of times that the procedure, function or sub-routine is actually called, and information indicative of call relationship between said procedure, function or sub-routine with executing the object program obtained through said third process;

fifth process of arranging said procedure, function or sub-routine in said storage region corresponding to the cache line of the cache memory among the storage region of said primary storage device with avoiding cache conflict, on the basis of said dynamic information; and sixth process of generating a final object program by linking said procedure, function or sub-routine transformed in said first process and the object program obtained in said second process, on the basis of said arrangement information.

21. A computer readable memory as set forth in claim 20, wherein in said second process, said procedures, functions or sub-routines are divided into a plurality of groups on the basis of call frequency, and said procedures, functions or sub-routines are arranged in said storage region corresponding to cache lines of a cache memory among the storage region of said primary storage device.

22. A computer readable memory storing a language processing program for transforming a source program described by a programming language into an object program described by a language executable by a data processing system, said language processing program comprising:

first process of transforming said source program into a temporary object program, and in conjunction therewith, upon executing said temporary object program, inserting a code for counting number of times that said procedure, function or sub-routine is actually called;

second process of linking one of the procedure, function or sub-routine that defined by a user in said source program, that defined and inspected by the user, that preliminarily prepared in a processing system in said programming language and that preliminarily prepared in a form of instruction code, with said temporary object program obtained through said first process;

third process of collecting dynamic information consisted of information indicative of number of times that the procedure, function or sub-routine is actually called, and information indicative of call relationship between said procedure, function or sub-routine with executing the object program obtained through said second process;

fourth process of arranging said procedure, function or sub-routine in said storage region corresponding to the cache line of the cache memory among the storage region of said primary storage device with avoiding cache conflict, on the basis of said dynamic information; and fifth process of transforming at least part of one defined by a user in said source program, one defined and inspected by the user, one preliminarily prepared in a processing system in said programming language and one preliminarily prepared in a form of instruction code among the procedure, function or sub-routine to be used in said source program into a form storable in an arbitrary storage region of said primary storage region, in which said object program is stored as actually used in said data processing system;

sixth process, after transforming said source program into said object program, concerning said object program, transforming procedure, function or sub-routine defined by a user in said source program into a form storable in arbitrary region of said primary storage device;

seventh process of generating a final object program by linking said procedure, function or sub-routine transformed in said fifth process and the object program obtained in said sixth process, on the basis of said arrangement information.

23. A computer readable memory as set forth in claim 22, wherein in said fourth process, said procedures, functions or sub-routines are divided into a plurality of groups on the basis of call frequency, and said procedures, functions or sub-routines are arranged in said storage region corresponding to cache lines of a cache memory among the storage region of said primary storage device.

* * * * *

UNITED STATES PATENT AND TRADEMARK OFFICE
CERTIFICATE OF CORRECTION

PATENT NO.    : 6,282,707 B1  
DATED         : August 28, 2001  
INVENTOR(S)   : Hiroko Isozaki It is certified that error appears in the above-identified patent and that said Letters Patent is hereby corrected as shown below:

Column 11,
Line 41, "system of" should read -- system of FIG. 1; --

Column 12,
Line 53, "in the…" should read -- In the… --

Column 14,
Line 44, "aid" should read -- and --

Column 15,
Line 2, "scored" should read -- stored --

Column 22,
Line 25, "Tight" should read -- right --

Column 25,
Line 25, "oil" should read -- of --
Line 48, "bias" should read -- basis --

Signed and Sealed this

Thirteenth Day of May, 2003

JAMES E. ROGAN  
*Director of the United States Patent and Trademark Office*